US009264356B2

(12) United States Patent (10) Patent No.: US 9,264,356 B2
Ogawa (45) Date of Patent: Feb. 16, 2016

(54) NETWORK GATEWAY APPARATUS

(71) Applicant: Keiko Ogawa, Tokyo (JP)

(72) Inventor: Keiko Ogawa, Tokyo (JP)

(73) Assignee: INTO Co., Ltd., Tokyo (JP)

(*) Notice: Subject to any disclaimer, the term of this patent is extended or adjusted under 35 U.S.C. 154(b) by 198 days.

(21) Appl. No.: 13/826,230

(22) Filed: Mar. 14, 2013

(65) Prior Publication Data

US 2013/0195109 A1    Aug. 1, 2013

Related U.S. Application Data

(63) Continuation of application No. PCT/JP2011/075963, filed on Nov. 10, 2011.

(30) Foreign Application Priority Data

Aug. 22, 2011  (JP) .................................. 2011-180215

(51) Int. Cl.
H04L 12/741    (2013.01)
H04L 12/46    (2006.01)
(Continued)

(52) U.S. Cl.
CPC .......... *H04L 45/745* (2013.01); *H04L 12/4625* (2013.01); *H04L 12/6418* (2013.01);
(Continued)

(58) Field of Classification Search
CPC ..... H04L 45/745; H04L 69/08; H04L 69/162; H04L 69/22; H04L 12/6418; H04L 12/4625; H04L 63/0281; H04L 63/0471; H04L 61/2525
USPC .......................................... 370/392; 709/245
See application file for complete search history.

(56) References Cited

U.S. PATENT DOCUMENTS 7,249,191 B1    7/2007  Hutchison et al.
2004/0098506 A1*  5/2004  Jean .............................. 709/245
(Continued)

FOREIGN PATENT DOCUMENTS

JP          3783142       3/2006
JP          2007-324726   12/2007
WO    WO 2005/015827 A1   2/2005

OTHER PUBLICATIONS

International Search Report issued Jan. 31, 2012 in PCT/JP2011/075963 filed Nov. 10, 2011.
(Continued)

*Primary Examiner* — Pao Sinkantarakorn
*Assistant Examiner* — Richard Chang
(74) *Attorney, Agent, or Firm* — Oblon, McClelland, Maier & Neustadt, L.L.P.

(57) ABSTRACT

A network gateway apparatus which adds encryption to easily implement secure communication without affecting network environment settings includes two network interface cards to communicate on two networks. The processor of the network gateway apparatus initializes communications through the network interface cards and uses a TCP/IP protocol stack to communicate through the network interface cards. When a packet is received by one of the network interface cards, the processor replaces the origin MAC and IP addresses and the destination MAC and IP addresses with temporary values. Then the processor encrypts the payload. The packet is sent to the TCP/IP protocol stack, which sends the packet to one of the two network interface cards according to the temporary values. The MAC an IP addresses of the final destination of the packet are rewritten to the packet and the packet is transmitted.

12 Claims, 28 Drawing Sheets

(51) Int. Cl.
H04L 12/64 (2006.01)
H04L 29/06 (2006.01)
H04L 29/12 (2006.01)

(52) U.S. Cl.
CPC .............. *H04L69/08* (2013.01); *H04L 69/162* (2013.01); *H04L 69/22* (2013.01); *H04L 61/2525* (2013.01); *H04L 63/0281* (2013.01); *H04L 63/0471* (2013.01)

(56) References Cited

U.S. PATENT DOCUMENTS

2006/0190720 A1 8/2006 Ozaki et al.
2008/0059788 A1 3/2008 Tardo et al.
2012/0066489 A1 3/2012 Ozaki et al.

OTHER PUBLICATIONS

P. Hoffman, SMTP Service Extension for Secure SMTP over TLS, Network Working Group, Internet Mail Consortium, Jan. 1999, pp. 1-8.
C. Newman, Using TLS with IMAP, POP3 and ACAP, Network Working Group, Innosoft, Jun. 1999, pp. 1-15.
Supplementary European Search Report issued Mar. 18, 2015 in European Patent Application No. 11871375.9.

* cited by examiner

Fig. 3

209 Inside NIC Address Table

| |
|---|
| Protocol Type (TCP/UDP) |
| Origin MAC Address |
| Origin IP Address |
| Origin Port Number |
| Destination MAC Address |
| Destination IP Address |
| Destination Port Number |
| Port Number for Indexing |
| Counter Value for Timer |

210 Outside NIC Address Table

| |
|---|
| Protocol Type (TCP/UDP) |
| Origin MAC Address |
| Origin IP Address |
| Origin Port Number |
| Destination MAC Address |
| Destination IP Address |
| Destination Port Number |
| Port Number for Indexing |
| Dynamic Port Number |
| Counter Value for Timer |

211 XPTCP Policy Table

| |
|---|
| Protocol Type (TCP/UDP) |
| Port Number for Indexing |
| Record Number |

202 Network Configuration Data Memory

| |
|---|
| Inside NIC MAC Address |
| Inside NIC IP Address |
| Outside NIC MAC Address |
| Outside NIC IP Address |

204 Temporary IPMAC List

| |
|---|
| Inside NIC IP Address |
| First Temporary MAC Address |
| First Temporary IP Address |
| Outside NIC IP Address |
| Second Temporary MAC Address |
| Second Temporary IP Address |

208 XPTCP Processing Object Master

| |
|---|
| Record Number |
| Protocol Type (TCP/UDP) |
| Origin IP Address |
| Origin Port Number |
| Destination IP Address |
| Destination Port Number |
| Encryption Type |

(Address Conversion Unit) Inside NIC Packet Receiving Process (Address Conversion Unit) Outside NIC Packet Receiving Process (Address Conversion Unit) Outside NIC Packet Transfer Process (Address Conversion Unit) Inside NIC Packet Sending Process (Socket Processing Unit) Initialization Process (Socket Processing Unit) Connection Request Transfer Process

NETWORK GATEWAY APPARATUS

REFERENCE TO RELATED APPLICATIONS

This application is a continuation of International Application No. PCT/JP2011/075963 filed on Nov. 10, 2011 and incorporated herein by reference. International Application No. PCT/JP2011/075963 claims priority to JP 2011-180215 filed Aug. 22, 2011 and also incorporated herein by reference.

BACKGROUND

The advancements described herein relate to a network gateway apparatus that adds an encrypted communication function to increase communication security without requiring any network setting changes to the existing network environment.

Technical limitations in TCP/IP networks and the pervasiveness of the Internet have led to many network security issues. For example, internet mail (email) is fundamentally equivalent to a postcard, and if a communication path through which an email is sent is tapped by an unauthorized party, the unauthorized party may easily acquire both the header and content of the email.

Certain conventional methods of securing communications, such as email or web browsing, through encryption require that the application program used for the communication perform the encryption or at least be aware of the encryption. In this case, a problem arises in that different applications that perform encryption may not be compatible with each other. Therefore, encrypted communication may not be possible among these incompatible applications.

Other conventional methods for providing secure network communications, such as IPSec, implement encryption in the network layer rather than in the application layer. Therefore, when IPSec is used, applications do not have to perform the data encryption and need not even be aware that encryption is being performed at the network layer. This reduces the processing overhead of the communication application, and addresses the issue of incompatibility among communication applications. However, because IPSec requires user authentication that is separate from the user authentication required by the communication application, IPSec can be cumbersome to use, and because IPSec encrypts at the network layer, IPSec-encrypted packets may be more difficult to route and network settings may have to be modified in response. Thus, a need exists for a method of providing secure, encrypted network communications without burdening high-level communication applications with the encryption and without requiring changes to the network environment.

SUMMARY

In view of the technical limits of conventional network security methods, transport layer authentication and encryption is presented herein. For example, expanded TCP (eX-Pand), which is a technique for authentication and encryption in the transport layer (also referred to as XPTCP) is presented.

When XTCP is implemented in an existing network environment, it is preferable to minimize the XPTCP overhead on the existing network and its components. It is also desirable that the XPTCP be implemented without changing setting on the network or on the terminals connected thereto.

To implement the XPTCP functions without adding new software to a terminal residing on a TCP/IP network, the new XPTCP functions are added to a gateway apparatus that can be inserted in a network path that includes the terminal. However, this change alone may still require some setting changes in the terminal. For example, when the gateway apparatus is a proxy server, the terminal uses a proxy server compatible application program for communication, and this program requires that the appropriate IP address and port number of the proxy server be set therein. When the gateway apparatus is a router, the IP address of a default gateway must also be set in the terminal. When the gateway apparatus is introduced into an existing network environment, the IP address chosen for the gateway apparatus must be confirmed to be available and reserved for the apparatus. Setting changes to other network devices, such as a router, may also be necessary because these devices may already be acting as a default gateway.

Therefore, the advancements described herein are made to solve the above-described problems by providing a network gateway apparatus that adds encryption communication functions to a network environment. In this way communication security is increased without changing existing network environment parameters.

In one embodiment, the advancements include a network gateway apparatus that has a first network interface card connected to a first network and which communicates with devices connected to the first network, and a second network interface card connected to a second network and which communicates with devices connected to the second network. A processor of the network gateway apparatus includes an initialization unit that initializes the first and second network interface cards to an unprotected state, and a TCP/IP protocol stack that performs communication processing between the first and second network interface cards. When a packet is received via the first network interface card, the processor replaces an origin MAC address of the packet with a first temporary MAC address, an origin IP address with a first temporary IP address, a destination MAC address with a MAC address of the second network interface card, and a destination IP address with an IP address of the second network interface card. Then the processor transmits the packet to the TCP/IP protocol stack, and the TCP/IP protocol stack transmits the packet to the second network interface card based on the destination MAC address and the destination IP address of the packet after rewriting by the processor.

BRIEF DESCRIPTION OF THE DRAWINGS

A more complete appreciation of the advancements and many of the attendant features will be readily obtained as the same become better understood by reference to the following detailed description when considered in connection with the accompanying drawings. However, the accompanying drawings and their exemplary depictions do not in any way limit the scope of the advancements embraced by this specification. The scope of the advancements embraced by the specification and drawings are defined by the words of the accompanying claims:

FIG. 3 is a group of tables and field structures of a list included in the XPTCP gateway apparatus according to the exemplary embodiment of the present advancements;

DETAILED DESCRIPTION

Figure 1:
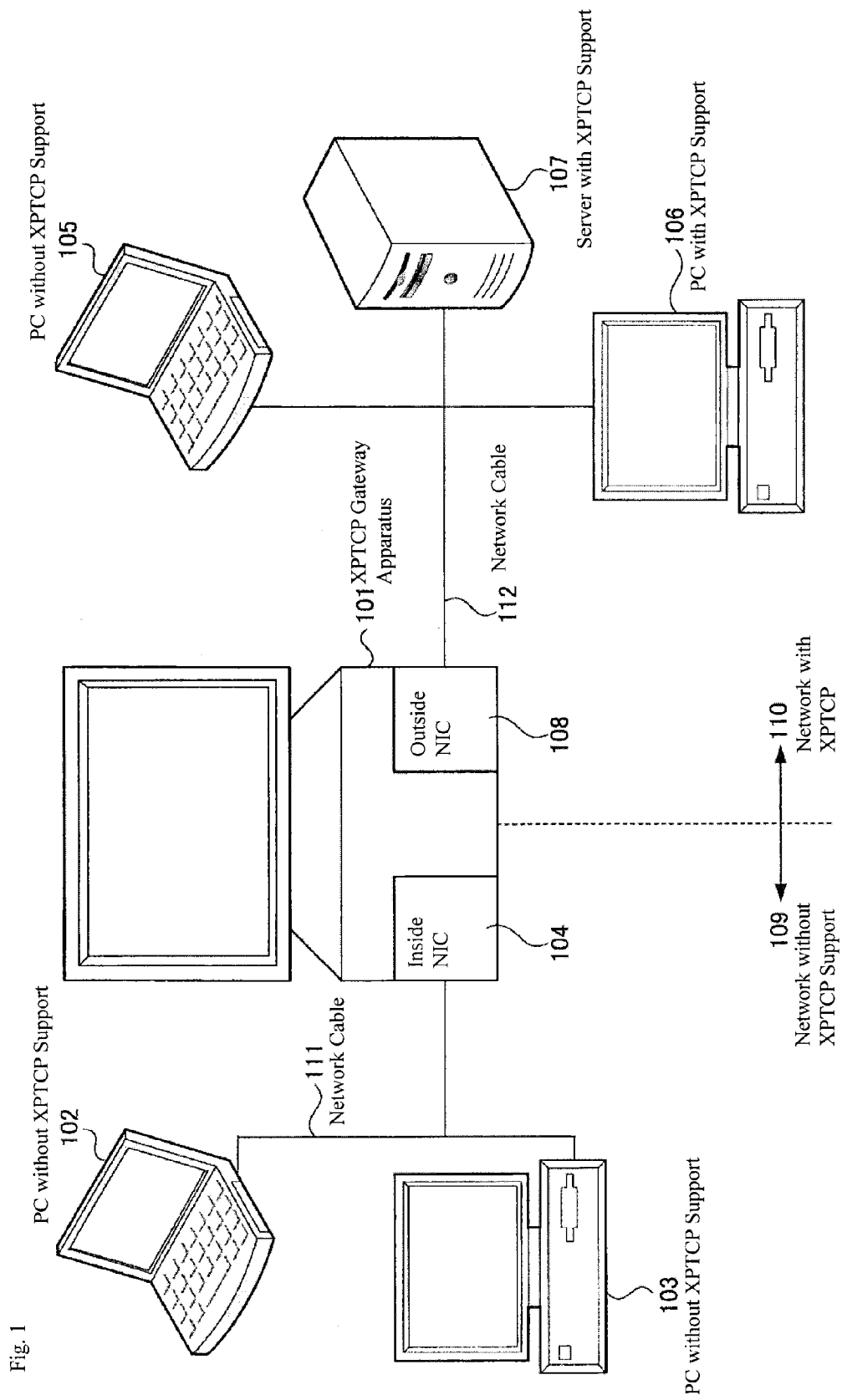
FIG. 1 is a schematic of a network including an XPTCP network gateway apparatus according to an exemplary embodiment of the present advancements.

FIG. 1 is a schematic of a network including a network gateway apparatus 101 according to exemplary embodiments of the present advancements, which provides XPTCP functions. On a left side of FIG. 1 is a non-XPTCP network 109 that does not support XPTCP and includes PC 102 and PC 104, which also do not support XPTCP. In the non-XPTCP network, PC 102 and PC 103 are both connected to an inside NIC 104 of the XPTCP gateway apparatus 101 through network cable 111.

The right side of FIG. 1 includes an XPTCP network 110, which supports XPTCP, and includes XPTCP-compatible server 107, XPTCP-compatible PC 106 and PC 105 without XPTCP support. In the XPTCP network 110, the server 107, PC 106 and PC 105 are connected to an outside NIC 108 of the XPTCP gateway apparatus 101 via network cable 112. Thus, the XPTCP gateway apparatus 101 links non-XPTCP network 109 to XPTCP network 110, and is in a communication path therebetween. Of course, the XPTCP compatible network 110 could be connected to the inner side NIC 104 and the XPTCP incompatible network 109 could be connected to the outer side NIC 108 without departing from the scope of the present advancements. Accordingly, the inner side NIC 104 and the outside NIC 108 could be termed "first" and "second" NICs as one of ordinary skill in the art would recognize.

The XPTCP gateway apparatus 101 processes packets transmitted back and forth between the XPTCP network 110 to the non-XPTCP network 109 so that communication between devices on the non-XPTCP network 109, such as PC's 102 and 103, and devices on the XPTCP network 110, such as server 107 or PC 106, can take place. Details of the packet processing executed in the XPTCP gateway apparatus 101 are described below.

As noted above, the XPTCP gateway apparatus 101 provides XPTCP functions with respect to both devices with XPTCP support and those without. For example, when a device, such as PC 102, which does not support XPTCP, connects to another device without XPTCP support, such as PC 105 on the XPTCP network 110, the XPTCP gateway apparatus 101 transmits packets between the non-XPTCP network 109 and the XPTCP network 110 without modification. In other words, packets flow through the XPTCP gateway apparatus 101 in their original form. When PC 102 on the non-XPTCP network 109 communicates with a device on the XPTCP network 110 that supports XPTCP, such as PC 106 or server 107, the XPTCP gateway apparatus 101 converts a packet transmitted from the PC 102 into an XPTCP packet, and transmits the XPTCP packet to the device with XPTCP support (PC 106 or server 107.)

Figure 2:
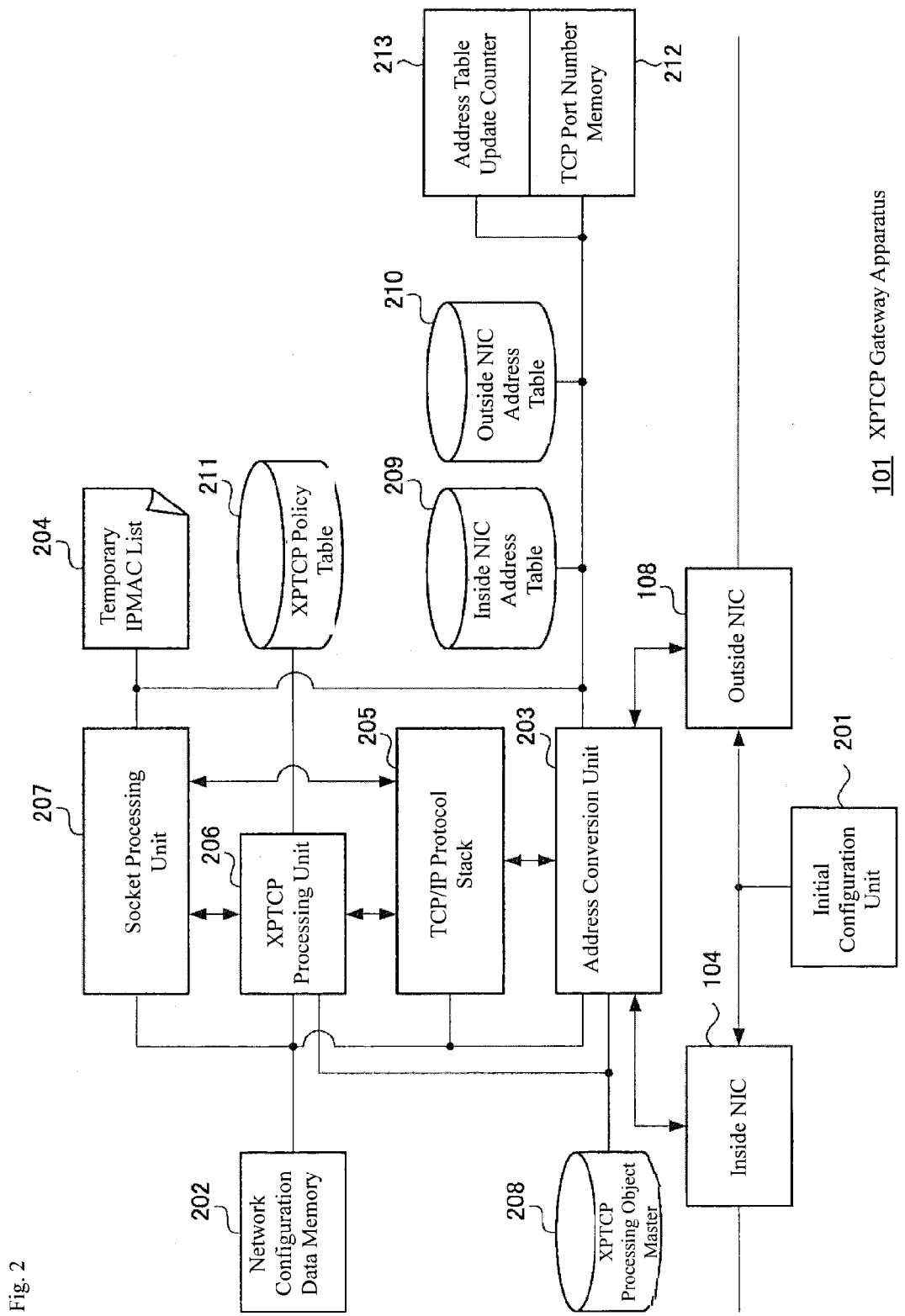
FIG. 2 is a functional block diagram of a XPTCP gateway apparatus according to the exemplary embodiment of the present advancements.

FIG. 2 is a block diagram of the internal structure of the XPTCP gateway apparatus 101 according to exemplary embodiments of the present advancements. The XPTCP gateway apparatus 101 can be implemented as a network computer that includes a processor and memory (RAM/ROM) in order to run a network operating system (OS) and instruction code for XPTCP functionality. For example, OS's such as Windows (trademark), Linux (trademark), or Apple's OSX (trademark) may be used. However, since the XPTCP gateway apparatus 101 is installed on a network communication path, a computer acting as the XPTCP gateway apparatus functions requires at least two network interface cards (NIC) to at least implement the inside NIC 104 and the outside NIC 108 as described above. Of course, the XPTCP functionality described herein may also be implemented as computer-readable code stored in a computer-readable medium, such as RAM, ROM, a hard disk drive, a CD-ROM, a DVD, etc., in order to cause other devices to perform the XPTCP and encryption functions by executing the computer-readable code.

The inside NIC 104 and the outside NIC 108 are conventional network interface cards to establish connections on TCP/IP networks as is known. Both the inside NIC 104 and the outside NIC 108 include 48-bit MAC (Media Access Control) addresses, as well as corresponding device drivers. Upon start up of the network OS of the XPTCP gateway apparatus 101, the initial configuration unit 201 sets both the inside NIC 104 and the outside NIC 108 to an unprotected mode, and establishes basic settings and network initialization. In this mode, both NICs can receive and read all packets flowing through their respective networks. The respective MAC addresses and IP addresses of the inside and outside NICs 104, 108 are stored as part of the network setting information in memory 202 of the XPTCP gateway apparatus 101. As can be appreciated, the network OS (not shown) also uses the network settings information to set up the basic network environment upon initialization.

When an address conversion unit 203 of the XPTCP gateway apparatus 101 receives a packet from the inside NIC 104, it reads a temporary IPMAC list 204, and an inside NIC address table 209 from the network setting information memory 202. The transmission origin MAC address, transmission origin IP address, a transmission origin port number, a destination MAC address, and a destination IP address attached to the packet are all converted into a first temporary NIC MAC address, a first temporary NIC IP address, a port number for indexes, an inner side NIC MAC address, and an inner side NIC IP address, respectively. The destination port number, however, is not changed. These values are then provided to the TCP/IP protocol stack 205 of the OS.

Similarly, when a packet is received from the outside NIC 108, the address conversion unit 203 reads the temporary IPMAC list 204, and the outside NIC address table 210 from the network setting information memory 202. The transmission origin MAC address, transmission origin IP address a transmission origin port number, a destination MAC address, a destination IP address, and a destination port number attached to the packet are then all converted into a second temporary NIC MAC address, a second temporary NIC IP address, a port number for indexes, an outer side NIC MAC address, an outer side NIC IP address, and a dynamic port number, respectively. This information is then provided to the TCP/IP protocol stack 205 of the OS.

The address conversion unit 203 also refers to the outside NIC address table 210, which includes the transmission origin MAC address, the transmission origin IP address, the transmission origin port number, the destination MAC address, destination IP address, and destination port number originally attached to the packet, when a packet transmitted to the outside NIC 108 from the TCP/IP protocol stack 205 is received. The address conversion unit 203 uses the port number as an index in order to find the information in the outside NIC address table 210. Then the address conversion unit 203 restores this information in the packet and transmits the packet to its final destination via the outside NIC 108.

When a packet is sent to the inside NIC 104 by the TCP/IP protocol stack 205, the address conversion unit 203 refers to the inside NIC address table 209, which includes the transmission origin MAC address, the transmission origin IP address, the transmission origin port number, the destination MAC address, destination IP address, and destination port number originally attached to the packet, using the port number as an index to identify this information in the table. Then the address conversion unit 203 restores this information in the packet and transmits the packet to its final destination via the inside NIC 104.

When an address resolution protocol (ARP) packet is sent to the outside NIC 108 by the TCP/IP protocol stack 205, the address conversion unit 203 responds with the second NIC MAC address from the temporary IPMAC list, and the TCP/IP protocol stack 205 continues operation based on this temporary address as if the temporary address corresponded to a true physical medium or device.

The inside NIC address table 209 (also referred to as a first NIC address mapping table) is a table used by the address conversion unit 203 to rewrite the MAC address, IP address, and port number attached to a packet being transmitted between the inside NIC 104 and the TCP/IP protocol stack 205. The outside NIC address table 210 (also referred to as a second NIC address mapping table) is a table used by the address conversion unit 203 to rewrite the MAC address, IP address, and port number attached to a packet transmitted between the outside NIC 108 and the TCP/IP protocol stack 205.

Unless otherwise specified, the following discussion will refer to devices without XPTCP support as a "terminal" or "terminals," and devices with XPTCP support as a "server" or "servers." As in FIG. 1, devices without XPTCP support are included in the non-XPTCP network 109 and devices with XPTCP support are included in the XPTCP network 110. PC 105 will continue to be referred to as "PC 105" as it does not have XPTCP support, but is located in the XPTCP network 110.

The TCP/IP protocol stack 205 is a network driver program and forms part of the OS. The address conversion unit 203 uses the TCP/IP protocol stack 205 to transmit and receive packets between the inside and outside NICs 104, 108, as well as to transmit and receive data between application programs. The TCP/IP protocol stack 205 provides a socket application-program interface (API) (for example, a "BSD socket") that is used by application programs for communication. When a packet is received, the TCP/IP protocol stack 205 strips packet headers from the packet received from one of the two NICs in order of ARP header, IP header, TCP or UDP header, and provides the payload of the packet to a predetermined application. When a packet is transmitted, the TCP/IP protocol stack 205 segments the payload data received from a corresponding application through the socket into predetermined data sizes and inserts the segmented data into packet payload areas of each packet to be transmitted. Then, a TCP or a UDP header, an IP header and an ARP header are all added after which the packed is transmitted to a transmission destination through one of the two NICs.

In handling a TCP packet, the TCP/IP protocol stack 205 acts as a virtual communication channel using a 3-way handshaking protocol, such as SYN-ACK & SYN-ACK. Thus the XPTCP gateway apparatus 101 of this exemplary embodiment forms a connection between the inside NIC 104 and the outside NIC 108, and transfers data via this connection.

In a connection established by the TCP/IP protocol stack 205, the inside NIC address table 209 and the outside NIC address table 210 correlate an original transmission origin MAC address, a transmission origin IP address, a transmission origin port number, a destination MAC address, a destination IP address, and a destination port number attached to the packet using the port number as an index. In this way, the inside NIC address table 209 and the outside NIC address table 210 manage the connection created by the TCP/IP protocol stack 205.

The XPTCP processing unit 206, which can be an extension of a TCP processing unit, receives data from one socket of the TCP/IP protocol stack 205, and transfers the received data to another socket of the TCP/IP protocol stack 205. the processing performed by the XPTCP processing unit 206 includes authentication and encryption according to instructions stored in the XPTCP processing object master 208. When the XPTCP Processing unit 206 transfers the data received from one socket of the TCP/IP protocol stack 205 to the other socket of the TCP/IP protocol stack 205, the XPTCP processing unit 206 rewrites the transmission origin IP address, the transmission origin port number, destination IP address, and destination port number which are attached to the socket.

When a connect event is received from the TCP/IP protocol stack 205, the socket processing unit 207, which acts as a pseudo server program started when the OS starts, assigns in the packet received from the inside NIC 104 the transmission origin IP address attached to the socket which received the connect event, sends a connect request event to the TCP/IP protocol stack 205 to create a new socket for the outside NIC 108, also requests a transmission origin port number, a destination IP address, and a destination port number. The socket processing unit 207 opens and closes sockets with respect to the TCP/IP protocol stack 205. The XPTCP processing unit 206 performs the transmission and reception of data to and from the TCP/IP protocol stack 205.

In FIG. 2, the inside NIC 104, the outside NIC 108, the address conversion unit 203, the TCP/IP protocol stack 205, the XPTCP processing unit 206, and the socket processing unit 207 correspond to a hierarchical model of TCP/IP based on the seven levels of the open systems interconnection (OSI) reference model. The inside NIC 104 and the outside NIC 108, including their respective NIC drivers, correspond to physical and data link layers of the OSI model, the TCP/IP protocol stack 205 corresponds to a network layer (i.e., IP, ICMP (Internet Control Message Protocol), ARP) and a transport layer (TCP, UDP) of the OSI model, and the socket processing unit 207 corresponds to an application layer of the OSI model. So that unrelated packets can be processed, the address conversion unit 203 is arranged between the data link layer and the network layer, but the TCP/IP protocol stack 205 is not modified. The address conversion unit 203 is included in the network layer so that the transmission origin MAC address, the transmission origin IP address, the transmission origin port number, the destination MAC address, destination IP address, and destination port number attached to the packet can be rewritten thereby. The XPTCP processing unit 206 is interposed between the transport layer and the application layer and transfers network data streams, performs authentication and encryption, and/or manages socket processes other than opening and closing. Thus, the XPTCP processing unit 206 is interposed between the application layer and the transport layer in order to transfer data therebetween, and to perform authentication and encryption which cannot be done in an application layer.

If the network OS's native TCP/IP protocol stack 205 is not modified, it can only handle the communication with respect to an IP address stored in the network setting information memory 202 (i.e., the IP address attached to a NIC installed on the computer.) However, because the XPTCP gateway apparatus 101 transfers packets from two NICs, and implements authentication and encryption in the transport layer, the TCP/IP functions needed require an extra layer of complexity. To implement the XPTCP gateway apparatus 101 functionality while minimizing program size and processing overhead, the standard functions of the TCP/IP protocol stack 205 are used as much as possible. To achieve this, the XPTCP gateway apparatus 101 of the exemplary embodiment masks the fact that packets may be received on separate NICs so that the TCP/IP protocol stack 205 can process packets even if the packets are do not correspond to the IP address stored in the network setting information memory 202. Specifically, the transmission origin MAC address attached to the packet received from the inside NIC 104 or the outside NIC 108, a transmission origin IP address, a destination MAC address, and a destination IP address are replaced by a first temporary an IP address, a first temporary MAC address, etc., allocated by the XPTCP gateway apparatus 101. Then the packet is provided to the TCP/IP protocol stack 205. The details of replacing the MAC address of the transmission origin and destination attached to packet, and the rewriting process performed in the address conversion unit 203 and the XPTCP processing unit 206 is described below in detail with reference to FIGS. 18-20.

FIG. 3 includes various tables and the field structures of a list stored in the XPTCP gateway apparatus 101 according to exemplary embodiments of the present advancements. The inside NIC address table 209, the outside NIC address table 210, the XPTCP policy table 211, and the temporary IPMAC list 204 are all provided in a RAM (not shown) of the XPTCP gateway apparatus 101. When the XPTCP processing object master 208, provided in non-volatile storage, such as a hard disk drive unit (not shown), is initialized by the address conversion unit 203, the XPTCP processing object master 208 is copied to RAM (not shown). The network setting information memory 202 is also copied to RAM or otherwise provided in RAM.

Figure 4:
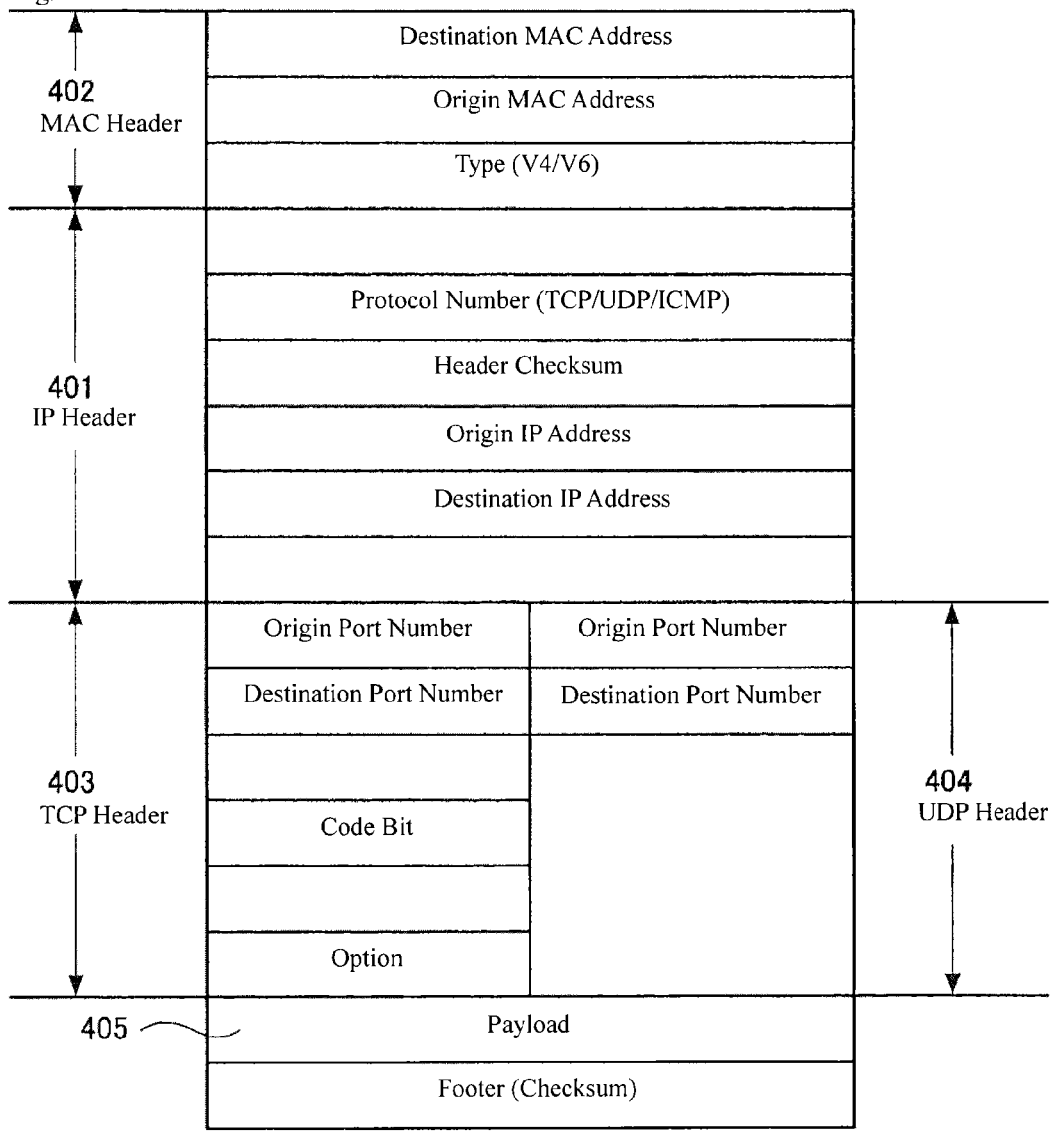
FIG. 4 is a packet structure schematic according to the exemplary embodiment of the present advancements.

FIG. 4 is schematic of the structure of a packet according to an exemplary embodiment of the present advancements. The field of the inside NIC address table 209 and the outside NIC address table 210 is described with reference to the field block diagram of FIG. 3. The inside NIC address table 209 includes a protocol classification field, a transmission origin MAC address field and a transmission origin IP address field. It also includes a transmission origin port number field, a destination MAC address field, a destination IP address field, a destination port number field, which is used for indexes, and a counter value field used for timers. The outside NIC address table 210 includes a protocol classification field, a transmission origin MAC address field, a transmission origin IP address field, a transmission origin port number field, a destination MAC address field, and a destination IP address field, a destination port number field, which is used as an index, and a dynamic port number field and a counter value field for use with timers.

A flag identifying a packet as a TCP or UDP packet is stored in a protocol classification field. This flag forms part of the protocol number of the IP header 401 of the packet. As can be appreciated, although the XPTCP gateway apparatus 101 of this exemplary embodiment is described with respect to TCP packet processing, it is equally suited for UDP packet processing. Hence, the protocol classification field allows the XPTCP gateway apparatus 101 to identify an incoming packet as a TCP or UDP packet and process it accordingly. The transmission origin MAC address attached to the packet communicated via the inside NIC 104 or the outside NIC 108 is stored in a transmission origin MAC address field, which is located in the transmission origin MAC address of the MAC header 402. The transmission origin IP address attached to the packet communicated by inside NIC 104 or the outside NIC 108 is stored in a transmission origin IP address field located in the transmission origin IP address of the IP header 401. The transmission origin port number attached to the packet is stored in a transmission origin port number field located in the transmission origin port number of the TCP header 403 or the UDP header 404. The destination MAC address attached to the packet is stored in a destination MAC address field in the destination MAC address of the MAC header 402. The destination IP address attached to the packet is stored in a destination IP address field, which is in the destination IP address of the IP header 401, and the destination port number attached to the packet is stored in a destination port number field in the destination port number of the TCP header 403 or the UDP header 404.

Before the address conversion unit 203 rewrites the header information of a packet and transmits the packet to an identified port number from the inside NIC 104 or the outside NIC 108, the transmission origin MAC address, transmission origin IP address, transmission origin port number, destination MAC address, destination IP address, and destination port number attached to the packet are stored in the inside NIC address table 209 and/or the outside NIC address table 210. As noted above, the destination port number serves as an index to these tables in order to identify the recorded information. For example, when a TCP SYN packet coinciding with the record of the XPTCP processing object master 208 is received from the inside NIC 104, the address conversion unit 203 records a new corresponding record in the inside NIC address table 209 of the TCP port number memory 212 of FIG. 2, using the port number as an index. Incidentally, since port numbers are used as an indexes, port numbers must be uniquely calculated and assigned. Therefore, when the value of a TCP port number in memory 212 is to be assigned, but the candidate value is already in use, the value of the TCP port number in memory 212 is incremented, and then checked again to ensure that it has not been previously assigned (i.e., that it is available.) Further, in TCP communication, a TCP SYN packet is a packet showing the start (establishment request) of a connection, a TCP ACK packet is a response packet confirming receipt of, for example, the TCP SYN packet, and a TCP FIN packet is a packet indicating closure of a connection (i.e., a disconnect request).

The dynamic port number provided only in the outside NIC address table 210 is stored in a dynamic port number field. This dynamic port number is automatically produced by the TCP/IP protocol stack 205 as a transmission origin port number when communicating to server 107 or PC 106 (both supporting XPTCP) via XPTCP compatible network 110 and outside NIC 108. In many cases, the number to this dynamic port is in the port number range of 49152-65535. Such dynamic ports are "a short-lived ports" and are provided by the TCP/IP protocol stack 205 as mentioned above.

An address table update counter 213 is also provided to measure elapsed time in order to determine when a record of the inside NIC address table 209 or the outside NIC address table 210 has expired and can be discarded. The value of the address table update counter 213 is stored in the counter value field for timers of the corresponding table.

The MAC and IP addresses of the inside NIC 104 and the outside NIC 108 are stored in the basic the network settings set when the network OS starts and are stored in the network setting information memory 202 of FIG. 3. That is, the network setting information memory 202 includes original parameter values for an inside NIC MAC address, an inside NIC IP address, an outside NIC MAC address, and an outer side NIC IP address.

The temporary IPMAC list 204 shown in FIG. 3 includes an inside NIC IP address field, a first temporary MAC address field, a first temporary IP address field, an outside NIC IP address field, a second temporary MAC address field, and a second temporary IP address field. The IP address of inside NIC 104 is stored in the inside NIC IP address field, and is obtained from the network setting information memory 202. The first temporary MAC address is stored in the first temporary MAC address field, and the first temporary IP address is stored in the first temporary IP address field. The IP address of outside NIC 108 is stored in the outside NIC IP address field, and obtained from the network setting information memory 202. The second temporary MAC address is stored in the second temporary MAC address field, and the second temporary IP address is stored in the second temporary IP address field. The first temporary MAC address, the first temporary IP address, the second temporary MAC address, and the second temporary IP address are the artificial parameter values used by the address conversion processing unit 203 and the XPTCP processing unit 206 to mask the corresponding original values so that the TCP/IP protocol stack 205 can process the packet.

The XPTCP processing object master 208 of FIG. 3, which can be considered an extended TCP processing object master, has a record number field, a protocol classification field, a transmission origin IP address field, a transmission origin port number field, a destination IP address field, a destination port number field, an encryption type filed, etc. The record number field is the record number of the XPTCP processing object master 208, and it is one of a set of consecutive numbers which identifies the record of the XPTCP processing object master 208 uniquely. In addition, the information stored in the record number field identifies a record used on the XPTCP policy table 211 uniquely (described below.) However, as long as it is possible to uniquely identify a record, identification does not have to be performed using a record number, as can be appreciated. The flag identifying a packet as TCP or UDP is stored in the protocol classification field to classify a packet entering from the inside NIC 104. This field is located in the protocol number of the IP header 401. The transmission origin IP address attached to the packet from the inside NIC 104 is stored in the transmission origin IP address field, located in the transmission origin IP address of the IP header 401. The transmission origin port number attached to the packet from the inside NIC 104 is stored in the transmission origin port number field located in the transmission origin port number of the TCP header 403 or the UDP header 404. The destination IP address attached to the packet from the inside NIC 104 is stored in a destination IP address field located in the destination IP address of the IP header 401. The destination port number attached to the packet from the inside NIC 104 is stored in the destination port number field located in the destination port number of the TCP header 403 or the UDP header 404. Information used for the XPTCP session, such as authentication and encryption type, is stored in the encryption type and/or other fields. Thus, the XPTCP processing object master 208 stores the IP address the IP address and a port number, as well as the information regarding encryption, etc., applied to a data stream which passes the connection formed between the inside NIC 104 and the outside NIC 108.

An exemplary XPTCP policy table 211 is illustrated in FIG. 3. The XPTCP policy table 211 includes a protocol type field, a port number (also used as indexes), and a record number field. The flag that identifies the packet which enters inside NIC 104 as a TCP or UDP packet is stored in the protocol type field as in the XPTCP processing object master 208. This is read from the protocol number of the IP header 401. The port number, which is used as an index and which is attached by the address conversion processing unit 203 to the packet, is stored in the port number field. The record number field corresponds to the XPTCP processing object master 208. Therefore, the record number described in the record number field designates the record of the XPTCP processing object master 208, and also refers to the encryption type and other fields of the XPTCP processing object master 208. Thus, the XPTCP policy table 211 links the port number to encryption type information, and identifies the encryption type applied to the data stream passing through the TCP connection corresponding to the port number.

Returning to FIG. 2 and continuing the description of each part of the XPTCP gateway apparatus 101 according to exemplary embodiments of the present advancements, the address table update counter 213 determines whether a period of time has elapsed, and deletes a record that is no longer used in the inside NIC address table 209 and the outside NIC address table 210 after this period of time elapses. The address table update counter 213 is a loop counter which counts from 0 to 119, for example, and then loops back to 0. Each of the number between 0 an 119 may represent the elapse of one second. Of course, each number may represent any other unit of time, or fraction thereof, without departing from the scope of the present advancements. Likewise, the address table update counter 213 may also count down instead of up. For example, the address update counter 213 may begin at 119 and count down to 0 before reverting to 119. As can be appreciated the endpoints of the count, 0 and 119, are merely exemplary and other values are possible without departing from the scope of the present advancements. In one example, in the TCP disconnection sequence described below, the address conversion unit 203 responds to a TCP FIN packet from either the inside NIC 104 or the outside NIC 108, by writing the value of the address update counter 213 in the count value field for timers of a corresponding record in the inside NIC address table 209 and the outside NIC address table 210. This value is then compared with the present value of the address table update counter 213 to determine whether, for example, 60 second or more have passed. If so, the communication session is closed, and the record is deleted.

The TCP port number memory 212 stores port number values for filling in the port number field uses as an index in the inside NIC address table 209 and the outside NIC address table 210. For example, when a TCP SYN packet is received from the inside NIC 104, a new connection is to be created. The address conversion unit 203 performs an address conversion in order to make the TCP/IP protocol stack 205 create the new connection. Because of this address conversion process, the TCP/IP protocol stack 205 forms the new connection with respect to a packet in which an artificial transmission origin IP address, a destination IP address, etc., different from the original transmission origin IP address, a destination IP address, etc., were attached.

When the address conversion unit 203 attaches the artificial transmission origin IP address, destination IP address, etc., to the packet, it correlates this information with the transmission origin IP address of the imitation, a destination IP address, etc., in the connection created by the TCP/IP protocol stack 205 in order to identify this connection and restore the original transmission origin IP address, a destination IP address, etc., in the packet. The port number is therefore used as an index. When a new record is created in the inside NIC address table 209, values of the TCP port number memory 212 are incremented by one, and the value is written in the port number field used as an index. Since the port number used as an index must be a number which the TCP/IP protocol stack 205 can recognize, the maximum value in the TCP port number memory 212 is 65535. Therefore, a value corresponding to a "short-lived port" created in this way is between 49152 and 65535. The TCP port number memory 212 may also include a loop counter to increment the port numbers.

Figure 5:
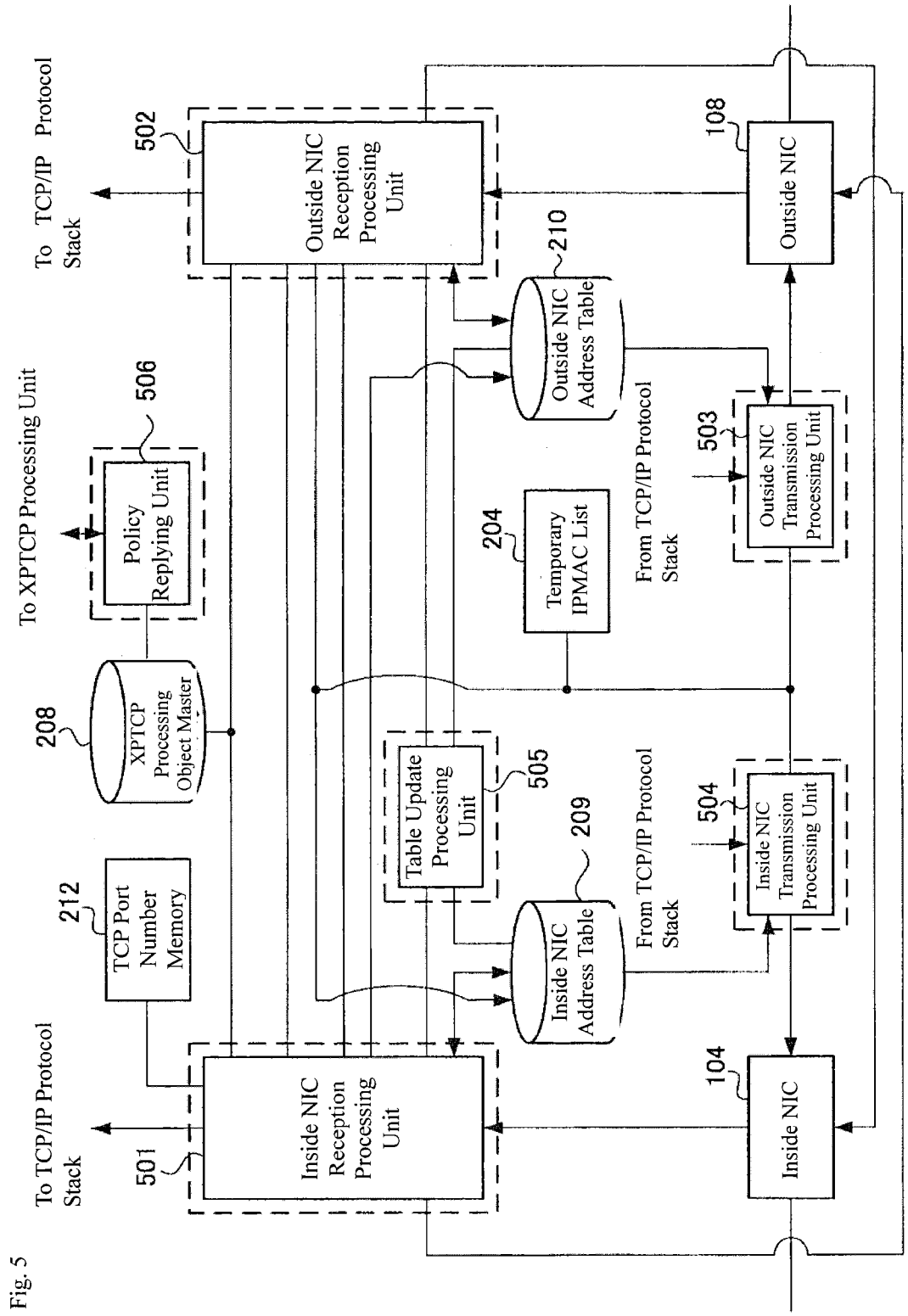
FIG. 5 is a functional block diagram of an address conversion unit according to the exemplary embodiment of the present advancements.

FIG. 5 is a functional block diagram of the internal structure of the address conversion unit 203 according to exemplary embodiments of the present advancements. The address conversion unit 203 is divided into five functional block including an inside NIC reception processing unit 501, an outside NIC reception processing unit 502, an outside NIC transmission processing unit 503, an inside NIC transmission processing unit 504, the table update processing unit 505, and the policy replying unit 506.

Figure 6:
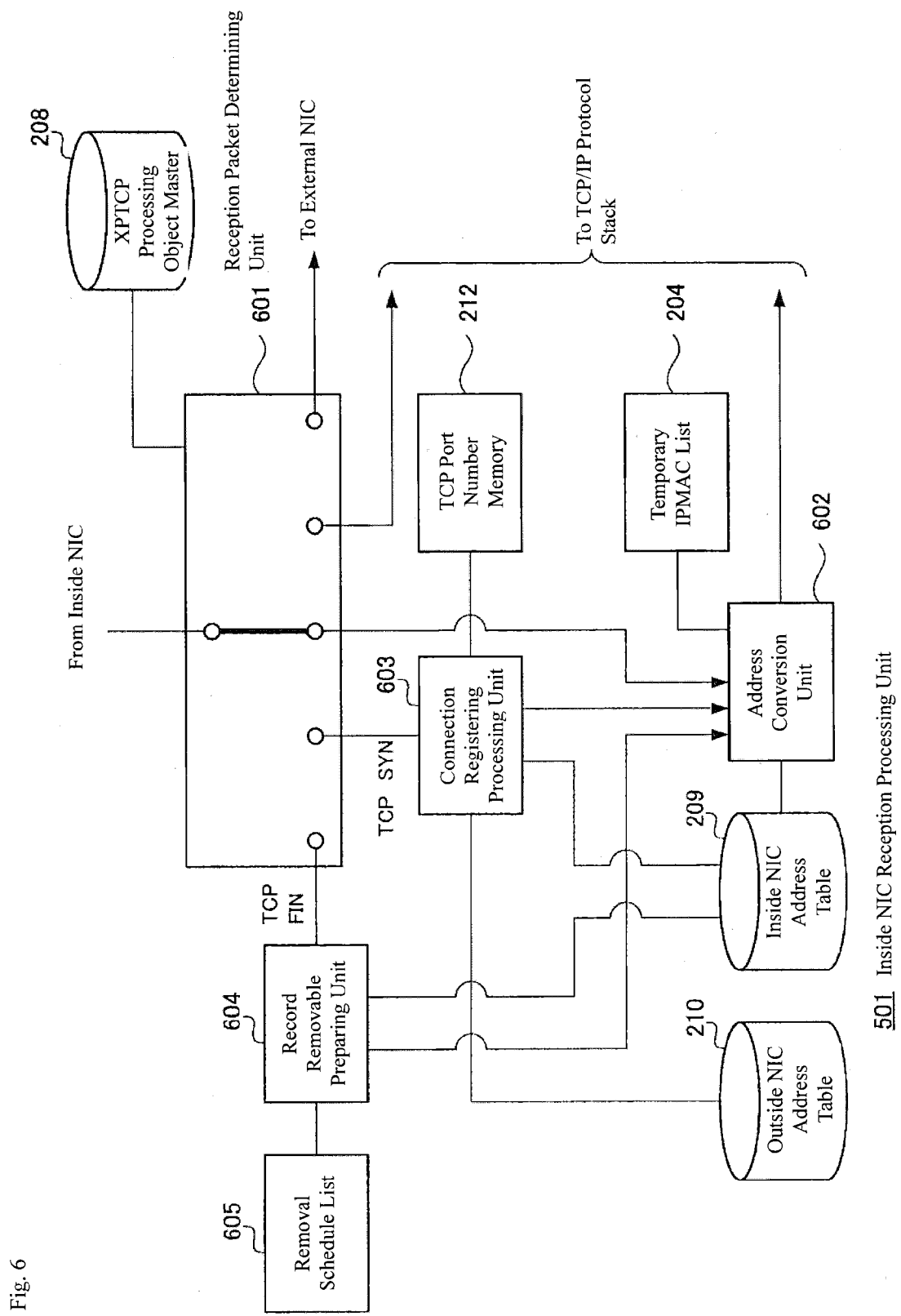
FIG. 6 is a functional block diagram of an inside NIC reception processing unit according to the exemplary embodiment of the present advancements.

The inside NIC reception processing unit 501 is described with reference to FIG. 6. A packet received by the inside NIC 104 is used to determine whether the reception packet determining unit 601 will perform the XPTCP process on the received packet with reference to the XPTCP processing object master 208. When the packet does not coincide with either an ICMP packet or the XPTCP processing object master 208, the reception packet determining unit 601 transfers the packet to the outside NIC 108 without performing XPTCP processing thereon. Likewise, when the packet is not a XPTCP processing object transmitted with respect to the XPTCP gateway apparatus 101, the reception packet determining unit 601 transfers the packet to the TCP/IP protocol stack 205 without performing XPTCP processing thereon. However, when the packet does coincide with the XPTCP processing object master 208, the reception packet determining unit 601 further examines the packet as explained below.

The reception packet determining unit 601 provides the received TCP packet to the address replacement unit 602 if the packet is a TCP data packet. The address replacement unit 602 searches the inside NIC address table 209 with a transmission origin MAC address, a transmission origin IP address, a transmission origin port number, a destination MAC address, a destination IP address, and a destination port number, to identify a record. The transmission origin MAC address, the transmission origin IP address, the transmission origin port number, destination MAC address, and destination IP address of a packet are then rewritten thereby, and the TCP packet is transferred to the TCP/IP protocol stack 205.

If the packet processed in the reception packet determining unit 601 is a TCP SYN packet, the packet will be unregistered in the inside NIC address table 209. Therefore, the reception packet determining unit 601 sends the TCP SYN packet to the connection registration processing unit 603, which creates a new record in the inside NIC address table 209 including the transmission origin MAC address, the transmission origin IP address, the transmission origin port number, the destination MAC address, destination IP address, and destination port number attached to the TCP SYN packet. The TCP port number memory 212 is also incremented by one, and this value is recorded in the port number field used as an index to inside NIC address table 209. The same record is also created in the outside NIC address table 210. Then, the connection registration processing unit 603 provides the TCP SYN packet to the address replacement unit 602. As in the case of the TCP packet described above, the address replacement unit 602 replaces the transmission origin MAC address, the transmission origin IP address, the transmission origin port number, the destination MAC address, and the destination IP address of the TCP SYN packet, and then transfers the TCP SYN packet to the TCP/IP protocol stack 205.

If the packet processed in the reception packet determining unit 601 is a TCP FIN packet signaling an end to the connection formed in the TCP/IP protocol stack 205, corresponding records in the inside NIC address table 209 and the outer side NIC address table 210 are to be deleted using a predetermined timing with respect to closure of the connections to the inside and outside NICs 104, 108. Thus, the reception packet determining unit 601 provides the TCP FIN packet to the record removal preparing unit 604, which searches the inside NIC address table 209 with the transmission origin MAC address, the transmission origin IP address, the transmission origin port number, the destination MAC address, destination IP address, and destination port number attached to the TCP FIN packet, to identify a corresponding record. The index port number of the corresponding record is written in the removal schedule list 605, which is provided in RAM and includes the index port number of the records to be deleted. The record removal preparation unit 604 provides the TCP FIN packet to the address replacement unit 602, which as in the case of the TCP packet and TCP SYN packet, rewrites the transmission origin MAC address, the transmission origin IP address, the transmission origin port number, the destination MAC address, and the destination IP address of the TCP FIN packet, and then transfers the TCP FIN packet to the TCP/IP protocol stack 205.

In addition, in any of the TCP packet, the TCP SYN packet, and the TCP FIN packet, the address replacement unit 602 will not rewrite a destination port number. The address replacement unit 602 rewrites the MAC address, IP address, and port number attached to the packet, with values identified in the temporary IPMAC list 204.

Figure 7:
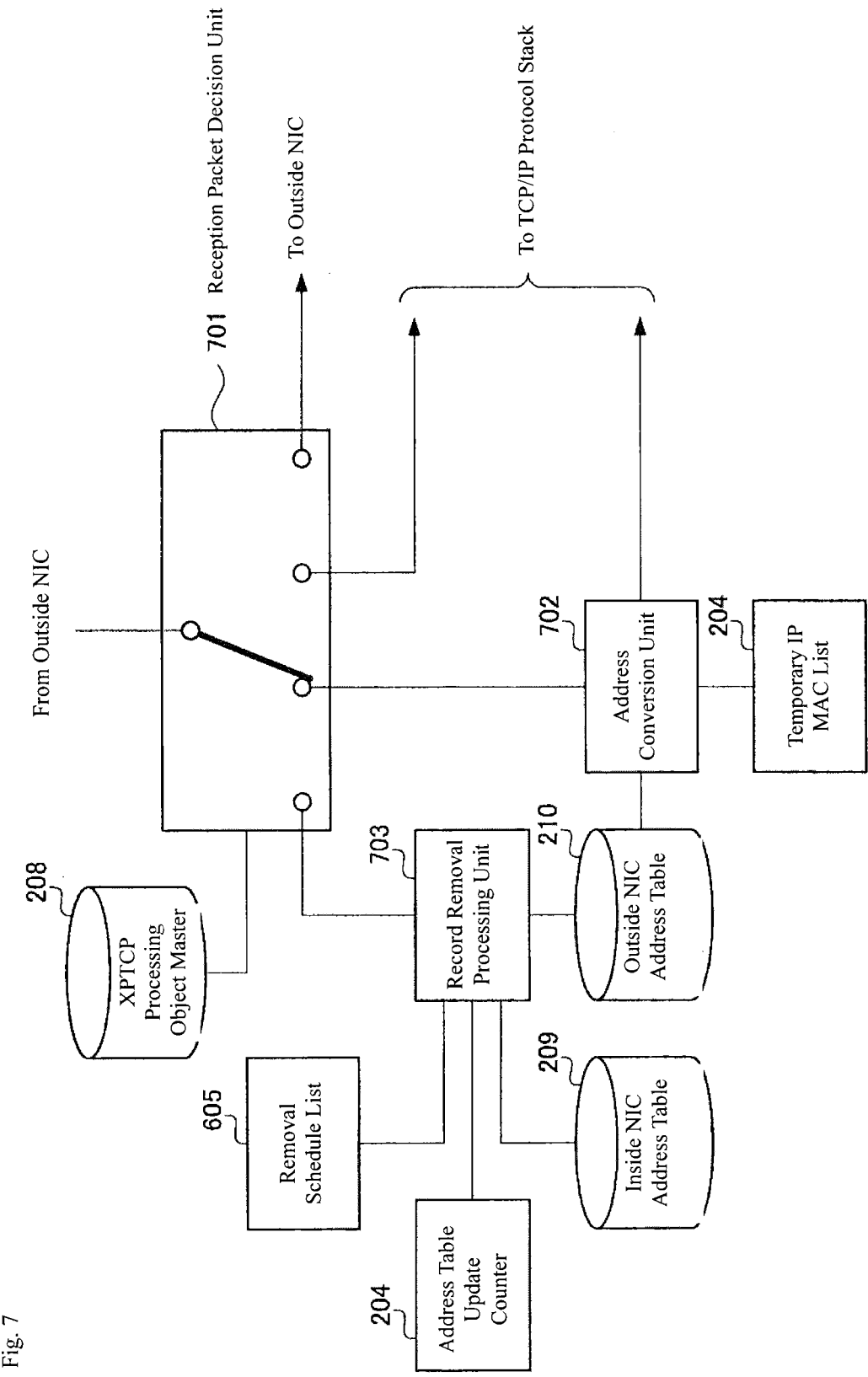
FIG. 7 is a functional block diagram of an outside NIC reception processing unit according to the exemplary embodiment of the present advancements.

Next, the outside NIC reception processing unit 502 is explained with reference to FIG. 7. The reception packet decision unit 701 uses the XPTCP processing object master 208 to determine whether a packet received by the outside NIC 108 receives will be processed according to the XPTCP process. When the packet received by the outside NIC 108 is not a process target that coincides with either an ICMP packet or the XPTCP processing object master 208, the outside NIC reception processing unit 502 transfers the packet to the inside NIC 104 without modification. Likewise, when the packet received by the outside NIC 108 is not an XPTCP processing object with respect to the XPTCP gateway apparatus 101, the outside NIC reception processing unit 502 transfers the packet to the TCP/IP protocol stack 205 without modification. However, when the packet received by the outside NIC 108 coincides with the XPTCP processing object master 208, the reception packet decision unit 701 further analyzes the packet as described below.

The reception packet decision unit 701 provides a received TCP packet to the address replacement unit 702 if the packet is a TCP data packet. The address replacement unit 702 searches the outside NIC address table 210 with a transmission origin MAC address, a transmission origin IP address, a transmission origin port number, a destination MAC address, a destination IP address, and a destination port number, to identify a corresponding record. The transmission origin MAC address, the transmission origin IP address, the transmission origin port number, the destination MAC address, destination IP address, and destination port number of a packet are then rewritten, and the packet is transferred to the TCP/IP protocol stack 205.

If the packet is a TCP FIN packet signaling an end to the connection formed in the TCP/IP protocol stack 205, the reception packet decision unit 701 deletes corresponding records in the inside NIC address table 209 and the outside NIC address table 210. As described above, deletion of these records is accomplished according to a predetermined timing from the end of both of connections with respect to the outside NIC 108, and with respect to the inside NIC 104. Then, the reception packet decision unit 701 transfers the TCP FIN packet to the record removal processing unit 703, which searches an inside NIC address table with the transmission origin MAC address, the transmission origin IP address, the transmission origin port number, the destination MAC address, destination IP address, and destination port number, which are attached to the TCP FIN packet, to identify a corresponding record. The index port number of the record is acquired, and whether the acquired index port number exists in the removal schedule list 605 is confirmed. If the removal schedule list 605 includes said index port number, the value of the address table update counter 213 is written in the counter value field for timers of the corresponding record of the outside NIC address table 210 and the inside NIC address table 209. Then, the record removal processing unit 703 transfers the TCP FIN packet to the address replacement unit 702, which, as in the case of the TCP data packet described above, rewrites the transmission origin MAC address, the transmission origin IP address, the transmission origin port number, the destination MAC address destination IP address, and the destination port number of the TCP FIN packet, and then transfers the TCP FIN packet to the TCP/IP protocol stack 205. The address replacement unit 702 rewrites the MAC address, IP address, and port number which are attached to the packet, by referring to the temporary IPMAC list 204 for corresponding values.

Figure 8:
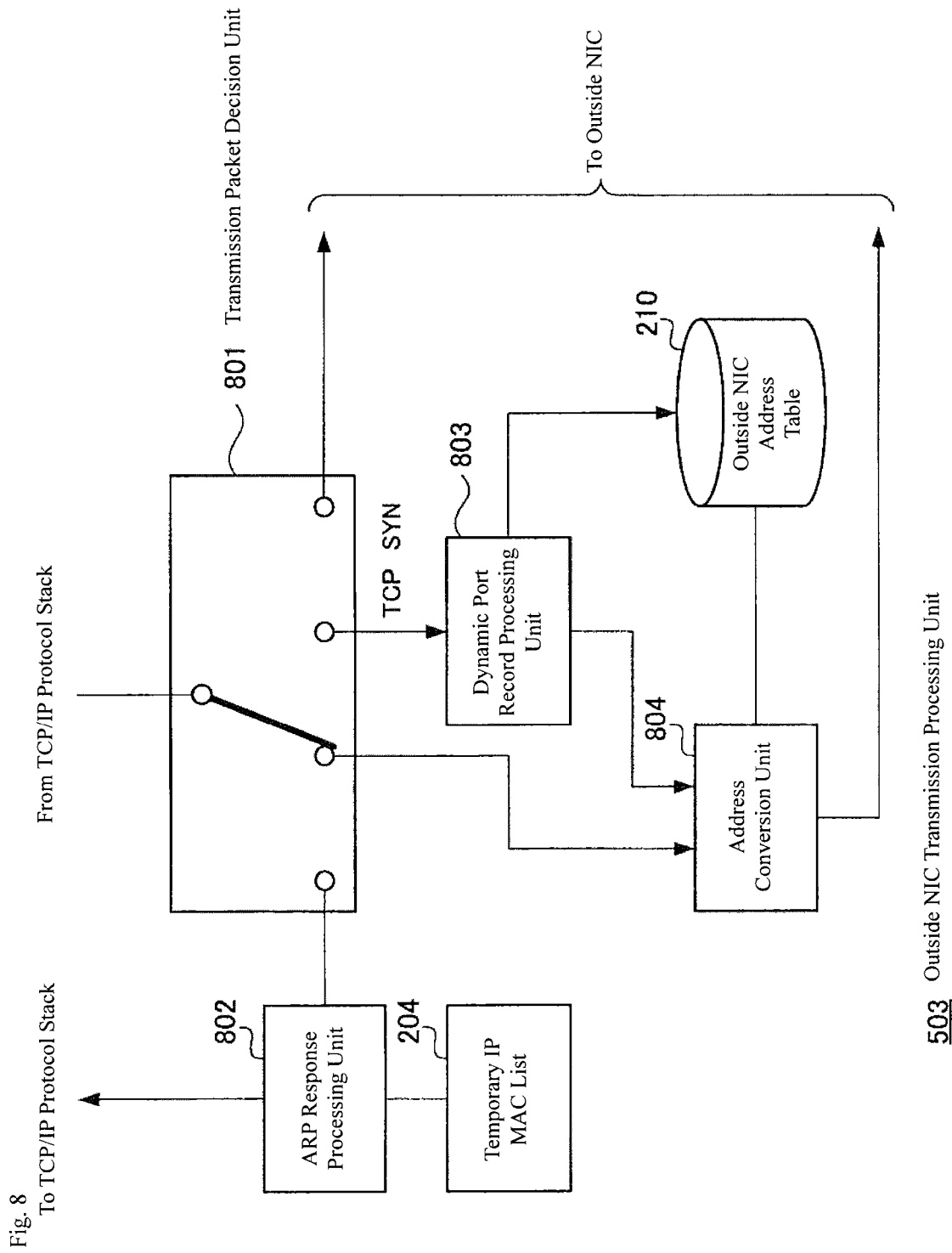
FIG. 8 is a functional block diagram of an outside NIC transmission processing unit according to the exemplary embodiment of the present advancements.

Next, the outside NIC transmission processing unit 503 is described with reference to FIG. 8. When the transmission packet decision unit 801 receives a packet sent from the TCP/IP protocol stack 205, it initially determines whether the packet is an address rewriting excluded packet, an address rewriting object TCP packet, or an ARP request packet. If a packet is a packet not subject to address rewriting, it is transmitted to the outside NIC 108 without further processing.

When the packet is an ARP request packet, and when the inquiry IP address attached to the ARP request packet is a second temporary IP address, since the MAC address attached to the packet is identified, the packet is transmitted when the TCP/IP protocol stack 205 to form a connection. Then, the transmission packet decision unit 801 provides the ARP request packet to the ARP response processing unit 802, which replies with a second temporary MAC address to the TCP/IP protocol stack 205 using the temporary IPMAC list 204.

When a packet is a TCP packet, and the destination IP address attached to the packet is a second temporary IP address, the transmission packet decision unit 801 confirms whether said packet is a TCP SYN packet. A TCP SYN packet indicates that the TCP/IP protocol stack 205 created a new connection, and that the TCP/IP protocol stack 205 needs to store the transmission origin port number of the new connection, i.e., a dynamic port number, in the outside NIC address table 210. Then, the transmission packet decision unit 801 provides the TCP SYN packet to the dynamic port record processing unit 803. The dynamic port record processing unit 803 acquires the transmission origin port number attached to the TCP SYN packet, as well as an assigned dynamic port number and index port number attached as a destination port number. If the applicable record of the outside NIC address table 210 is identified with the index port number, the dynamic port number will be recorded in the dynamic port number field of the record. The dynamic port record processing unit 803 then provides the TCP SYN packet to the address recovery unit 804. The address recovery unit 804 acquires the transmission origin MAC address, the transmission origin IP address, the transmission origin port number, the destination MAC address, destination IP address, and destination port number of the record identified with the destination port number in the outside NIC address table 210. The transmission origin MAC address, the transmission origin IP address, the transmission origin port number, the destination MAC address, destination IP address, and destination port number of a packet are then rewritten, and the packet is transmitted to out side NIC 108.

When the packet is a TCP packet, and the destination IP address attached to the packet is a second temporary IP address, the transmission packet decision unit 801 confirms whether said packet is a TCP SYN packet. If it is not a TCP SYN packet, the transmission packet decision unit 801 provides the TCP packet to the address recovery unit 804. The address recovery unit 804 acquires the transmission origin MAC address, the transmission origin IP address, the transmission origin port number, the destination MAC address, destination IP address, and destination port number of the record identified with the index port number in the outside NIC address table 210. The transmission origin MAC address, the transmission origin IP address, the transmission origin port number, the destination MAC address, destination IP address, and destination port number of a packet are then rewritten, and the packet is transmitted to the outside NIC 108.

Figure 9:
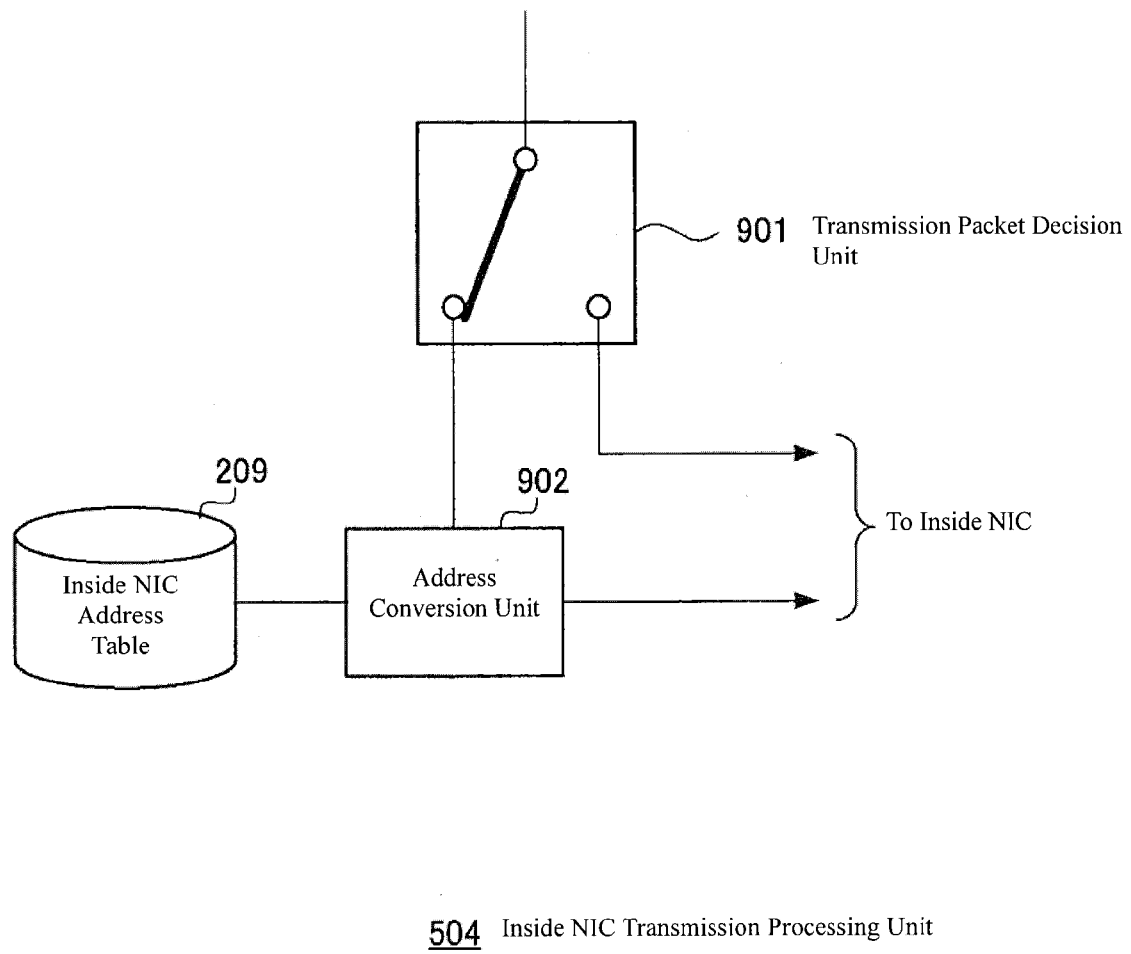
FIG. 9 is a functional block diagram of an inside NIC transmission processing unit according to the exemplary embodiment of the present advancements.

Next, the inside NIC transmission processing unit 504 is explained with reference to FIG. 9. When the transmission packet decision unit 901 receives a packet sent from the TCP/IP protocol stack 205, it initially determines whether the packet is an address rewriting excluded packet or an address rewriting object TCP packet. If the packet is not subject to address rewriting, the packet is transmitted to the inside NIC 104 without further processing. When the packet is a TCP packet, and the destination IP address attached to the packet is a first temporary IP address, the transmission packet decision unit 901 provides the TCP packet to the address recovery unit 902. The address recovery unit 902 acquires the transmission origin MAC address, the transmission origin IP address, the transmission origin port number, the destination MAC address, destination IP address, and destination port number of a record identified with the index port number in the inside NIC address table 209, and the transmission origin MAC address, the transmission origin IP address, the transmission origin port number, the destination MAC address, the destination IP address, and the destination port number of the packet are rewritten. The packet is then transmitted to the inside NIC 104.

Next, the table update processing unit 505 is described. The table update processing unit 505 executes every second as the address table update counter 213 is incremented. The count value field for timers of all the records of the inside NIC address table 209 and the outside NIC address table 210 are tested to determine whether there are records older than sixty seconds with respect to a connection closed by a TCP FIN packet. If there exists such a record, the record is deleted.

Next, the detail of the policy replying unit 506 is described. Reference is made to the XPTCP processing object master 208 and the inside NIC address table 209 by the policy replying unit 506 in response to a policy inquiry including the index port number sent from the XPTCP processing unit 206. The record number of the XPTCP processing object master 208 and encryption type with respect to the connection identified by the said index port number is then replied.

Figure 10:
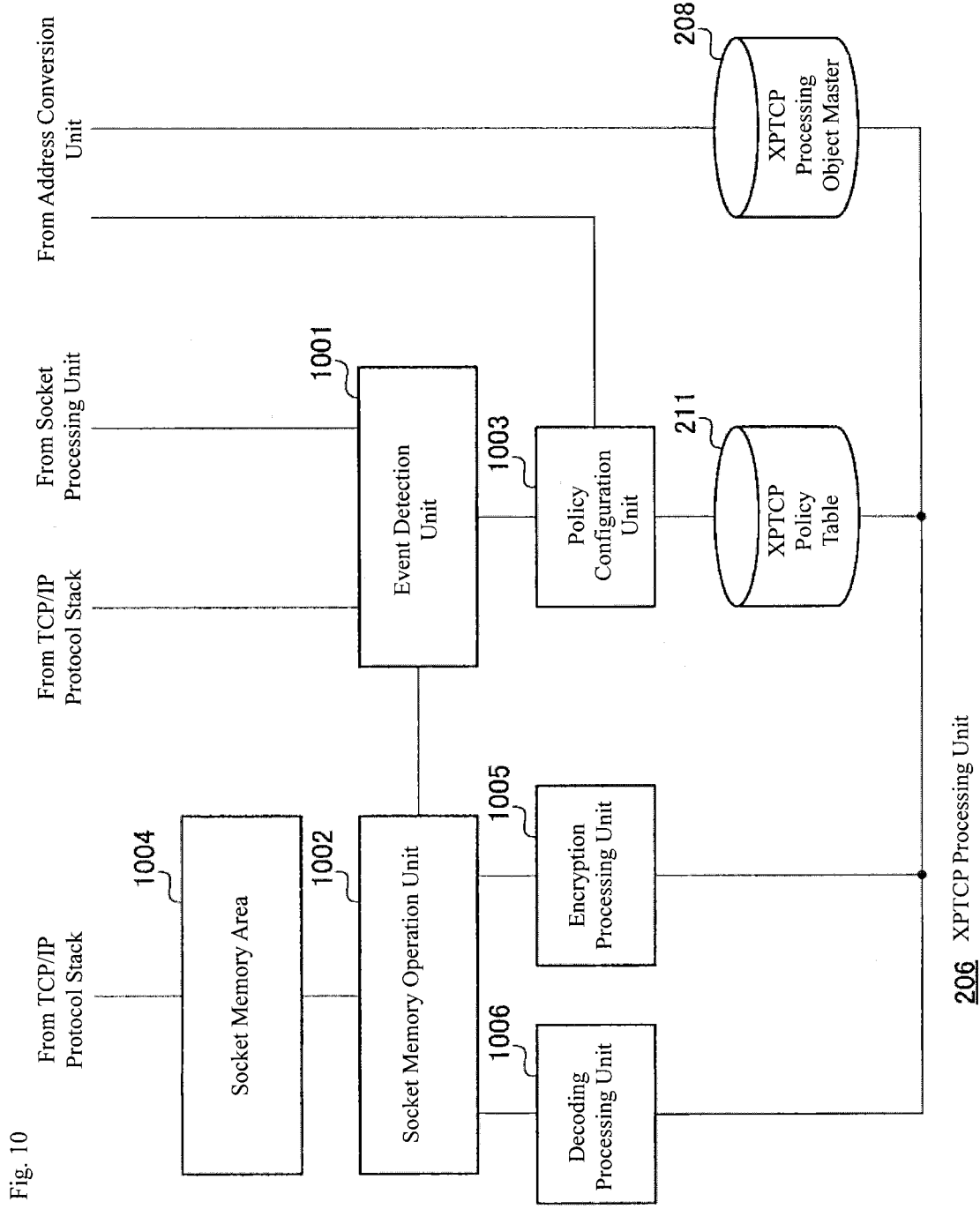
FIG. 10 is a functional block diagram of a XPTCP processing unit according to the exemplary embodiments of the present advancements.

An internal structure of the XPTCP processing unit 206 is described with reference to FIG. 10. The event detection unit 1001 detects an "accept" event, "connect request" event, and/or "close" event, which are obtained from the TCP/IP protocol stack 205. The socket memory operation unit 1002 and the policy configuration unit 1003 are controlled so that the socket memory operation unit 1002 obtains the data stream obtained from a socket by the encryption processing unit 1005 or by the decoding processing unit 1006. The data stream is stored in the socket memory area 1004 (which resides in RAM) in the TCP/IP protocol stack 205. The processed stream data is then provided to the predetermined socket on the socket memory area 1004. The policy configuration unit 1003 identifies a policy with respect to an address conversion processing unit that uses the index port number obtained by the event detection unit 1001. The event detection unit obtains the index port number from the socket memory operation unit 1002 and the policy configuration unit 1003 uses the index port number as an argument to an inquiry. To this inquiry, the policy replying unit 506 of an address conversion processing unit replies with the record number of the XPTCP processing object master 208. Then, the policy configuration unit 1003 records and links the index port number and the record number of the XPTCP processing object master 208 in the XPTCP policy table 211. Reference is then made to the XPTCP policy table 211 and the XPTCP processing object master 208 by the encryption processing unit 1005 to perform the designated encryption process with respect to the data stream received from the socket memory operation unit 1002. Reference is also made to the XPTCP policy table 211 and the XPTCP processing object master 208 by the decoding processing unit 1006 to perform the designated decoding process with respect to the data stream received from the socket memory operation unit 1002. In addition, an authentication function may also be performed by the XPTCP processing unit 206, as one of ordinary skill will recognize.

Operation of the address conversion unit 203 of the XPTCP gateway apparatus 101 is explained below with reference to FIGS. 11-17.

Figure 11:
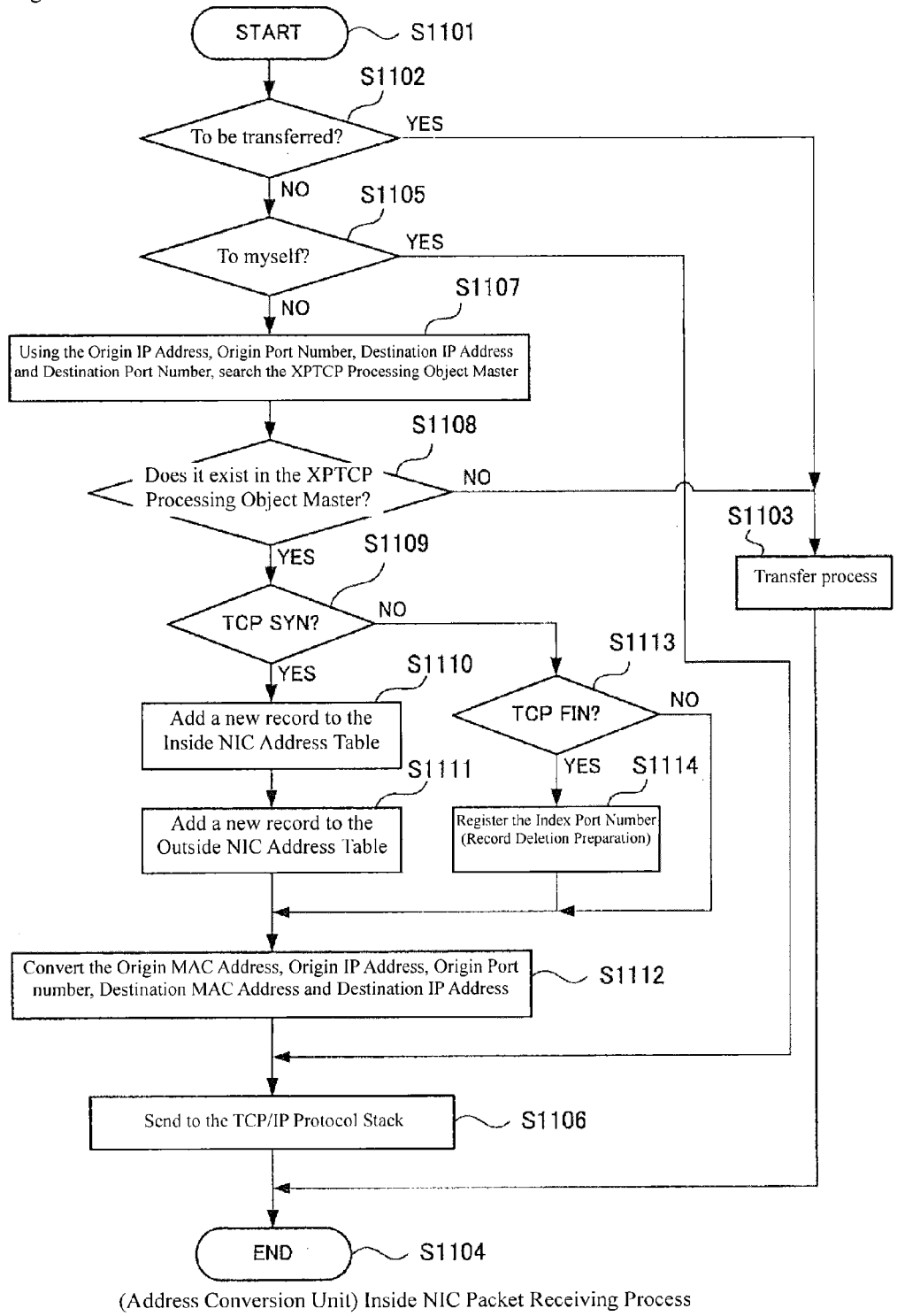
FIG. 11 is a flowchart of an inside NIC packet reception process carried out in the address conversion unit according to the exemplary embodiment of the present advancements.

FIG. 11 is a flowchart of the packet reception process of the address conversion unit 203 with respect to the inside NIC 104 according to an exemplary embodiment. When the process is started (S1101), the reception packet determining unit 601 initially determines whether the packet received by the inside NIC 104 is not a processing object, such as an ARP packet, an ICMP packet, etc. The received packet is identified as an ARP packet, an ICMP packet, etc., or otherwise not a processing object (YES in S1102), the packet is transferred by the receiving packet decision unit 601 to the outside NIC 108 without further processing (S1103), and the process ends (S1104).

In step S1102, when the received packet is a processing object (NO of S1102), the receiving packet decision unit 601 determines whether the packet is outside a XPTCP processing object of the XPTCP gateway apparatus 101 (S1105). If the received packet is not a XPTCP processing object of the XPTCP gateway apparatus (YES in S1105), the receiving packet decision unit 601 transfers the packet to the TCP/IP protocol stack 205 without further processing (S1106), and the process ends (S1104).

If in step S1105, the received packet is a XPTCP processing object of the XPTCP gateway apparatus 101 (NO of S1105), the reception packet determining unit 601 searches the XPTCP processing object master 208 with the transmission origin IP address, the transmission origin port number, destination IP address, and destination port number of the said packet (S1107). As a result of the search, a record is identified. The packet is not processed by the XPTCP gateway apparatus 101 if there is no combination of destination IP address and destination port number in the XPTCP processing object master 208 corresponding to that of the packet (NO of S1108). In that case, the reception packet determining unit 601 transfers the packet to the outside NIC 108 without further processing (S1103), and the process ends (S1104).

In step S1108, if the combination of a transmission origin port number, a destination IP address, and a destination port number exists in the XPTCP processing object master 208 (YES of S1108), the packet is processed by the XPTCP gateway apparatus 101 to rewrite its MAC address, IP address, and port number. Then, the reception packet determining unit 601 determines whether the received packet is a TCP SYN packet (S1109). If the received packet is a TCP SYN packet (YES of S1109), the reception packet determining unit 601 provides the TCP SYN packet to the connection registration processing unit 603. Upon receipt of the TCP SYN packet, reference is made to the TCP port number memory of the connection registration processing unit 603 to obtain a next available port number (used as an index), and a new record is recorded in the inside NIC address table 209 with the transmission origin IP address, the transmission origin port number, destination IP address, and destination port number of the received packet (S1110). A similar new record is also created in the outside NIC address table 210 (S1111).

The connection registration processing unit 603 additionally records the new record in the inside NIC address table 209 and the outside NIC address table 210. Then, the TCP SYN packet is sent to the address replacement unit 602 by the reception packet determining unit 601.

Referring to the index port number generated by the connection registration processing unit 603 and to the temporary IPMAC list 204 the address replacement unit 602 rewrites the transmission origin MAC address, the transmission origin IP address, the transmission origin port number, destination MAC address, and destination IP address of a TCP SYN packet (S1112). Specifically, a first temporary MAC address is written in place of the transmission origin MAC address attached to the packet, a first temporary IP address is written in place of the transmission origin IP address attached to the packet, the index port number (used as an index) is written in place of the transmission origin port number, the inside NIC MAC address is written in place of the destination MAC address, the destination IP address is rewritten bay the inside NIC IP address, but the destination port number is not changed. After the address replacement unit 602 rewrites these parameters, it transmits the TCP SYN packet to the TCP/IP protocol stack 205 (S1106), and the processing ends (S1104).

In step S1109, if the received packet is not a TCP SYN packet (NO of S1109), the reception packet determining unit 601 determines whether the packet is a TCP FIN packet (S1113). If the received packet is a TCP FIN packet (YES of S1109), the reception packet determining unit 601 provides the TCP FIN packet to the record removal preparation unit 604 with an index port number. The record removal preparation unit 604 writes the index port number of the TCP FIN packet in the removal schedule list 605 (S1104), and provides the TCP FIN packet and the index port number to the address replacement unit 602.

Referring to the index port number and the temporary IPMAC list 204, the address replacement unit 602 rewrites the transmission origin MAC address, the transmission origin IP address, the transmission origin port number, destination MAC address, and destination IP address of a TCP FIN packet (S1112). Specifically, the transmission origin MAC address is replaced by a first temporary MAC address, the transmission origin IP address is replaced by a first temporary IP address, the destination IP address is replaced by the inside NIC IP address, etc. However, the destination port number is not changed. After the address replacement unit 602 replaces these values, it transmits the TCP FIN packet to the TCP/IP protocol stack 205 (S1106), and the process ends (S1104).

In step S1113, the received packet is determined to be a TCP data packet (NO of S1113). Therefore, the reception packet determining unit 601 provides the TCP data packet to the address replacement unit 602 with an index port number. Referring to the index port number and the temporary IPMAC list 204, the address replacement unit 602 rewrites the transmission origin MAC address, the transmission origin IP address, the transmission origin port number, destination MAC address, and destination IP address of the TCP data packet (S1112). Specifically, the transmission origin MAC address is rewritten by a first temporary MAC address, the transmission origin IP address is rewritten by a first temporary IP address, the destination IP address rewritten by the inside NIC IP address, etc. The destination port number, however, is not changed. After the address replacement unit 602 rewrites this information, it transmits the TCP data packet to the TCP/IP protocol stack 205 (S1106), and the process ends (S1104).

Figure 12:
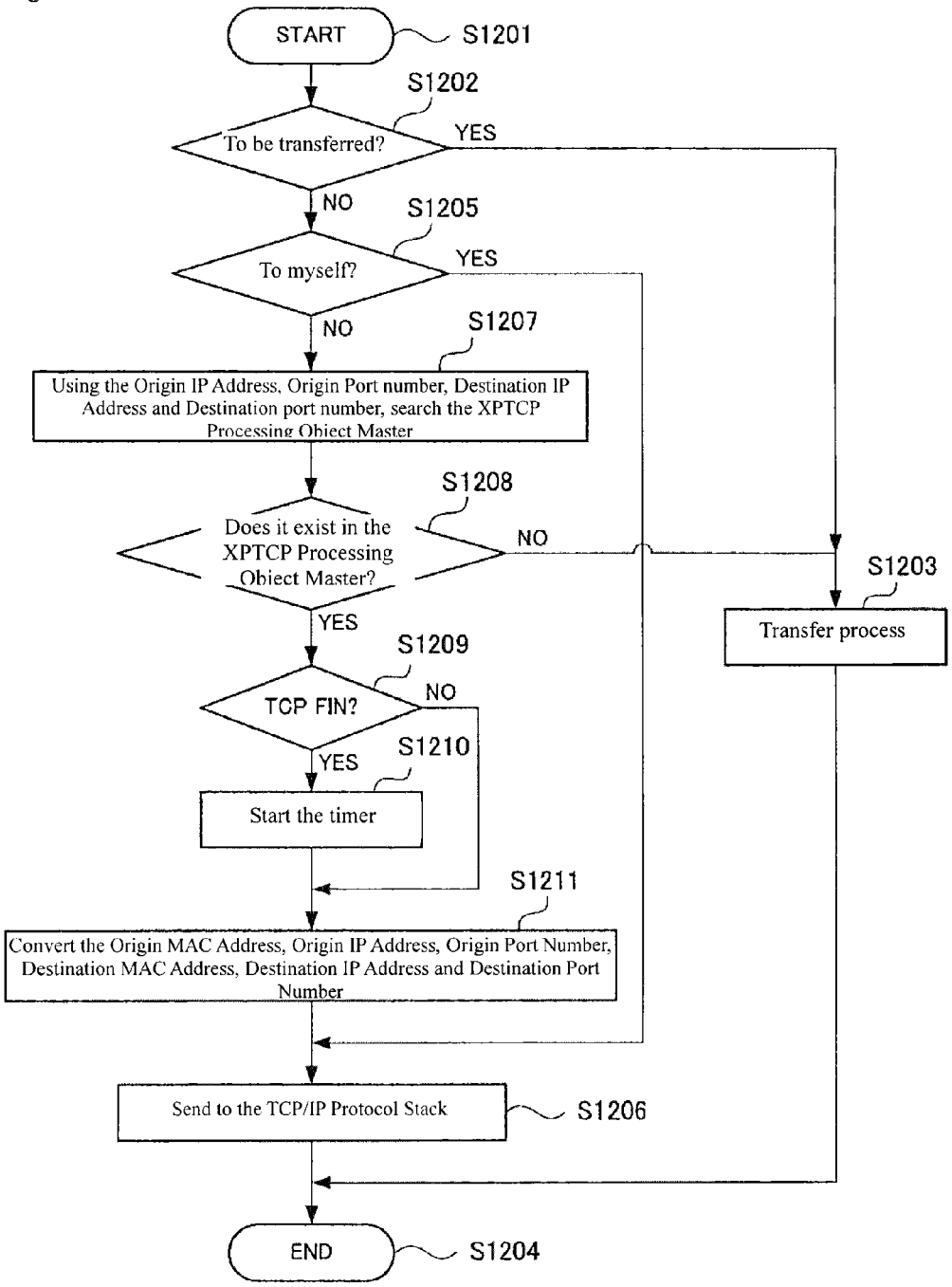
FIG. 12 is a flowchart of an outside NIC packet reception process carried out in the address conversion unit according to the exemplary embodiment of the present advancements.

FIG. 12 is a flowchart of the packet reception process performed in the address conversion unit 203 with respect to a packet received by the outside NIC 108. When the process is started (S1201), the receiving packet decision unit 701 initially determines whether the packet is not a processing object, such as an ARP packet, an ICMP packet, etc., (S1202). When the received packet is an ARP packet, an ICMP packet, etc., or otherwise not a processing object (YES of S1202), the reception packet decision unit 701 transfers the packet to the inside NIC 104 without further processing (S1203), and the process ends (S1204).

In step S1202, when the received packet is a processing object (NO of S1202), the reception packet decision unit 701 determines whether the packet is a XPTCP process target of the XPTCP gateway apparatus 101 (S1205). If the packet received by the XPTCP gateway apparatus 101 is not a processing object thereof (YES of S1205), the reception packet decision unit 701 transfers the packet to the TCP/IP protocol stack 205 without further processing (S1206), and the process ends (S1204).

When the packet received by the XPTCP gateway apparatus 101 is a XPTCP processing object thereof (NO of S1205), the reception packet decision unit 701 searches the XPTCP processing object master 208 with the transmission origin IP address, the transmission origin port number, destination IP address, and destination port number of the said packet to identify a record (S1207). If there is no combination of destination IP address and destination port number in the XPTCP processing object master 208 for the packet, the packet is not processed by the XPTCP gateway apparatus 101 (NO of S1208), and the reception packet decision unit 701 transfers the packet to the inside NIC 104 without modification (S1203). After that the process ends (S1204).

If the combination of transmission origin port number, destination IP address, and destination port number exists in the XPTCP processing object master 208 (YES of S1208), the packet is a processing object of the XPTCP gateway apparatus 101, and its MAC address, IP address, and port number are rewritten. Specifically, the reception packet decision unit 701 determines whether the received packet is a TCP FIN packet (S1209). If the received packet is a TCP FIN packet (YES of S1209), the reception packet decision unit 701 provides the TCP FIN packet to the record removal processing unit 703 with an index port number. The record removal processing unit 703 then confirms that the index port number of the TCP FIN packet is present in the removal schedule list 605, the value of the address table update counter 213 is written in the counter value field for timers of the corresponding record in the inside NIC address table 209 (S1210). Then, the record removal processing unit 703 provides the TCP FIN packet and the index port number to the address replacement unit 702.

Referring to the index port number and the temporary IPMAC list 204 the address replacement unit 702 rewrites the transmission origin MAC address, the transmission origin IP address, the transmission origin port number, the destination MAC address, destination IP address, and destination port number of a TCP FIN packet (S1211). Specifically, a second temporary MAC address is written in place of the transmission origin MAC address, a second temporary IP address is written in place of the transmission origin IP address, an index port number is written in place of the transmission origin port number, an outside NIC MAC address is written in place of the destination MAC address, an outside NIC IP address is written in place of the destination IP address, and a dynamic port number is written in place of the destination port number. After the address replacement unit 702 replaces these values, it transmits the TCP FIN packet to the TCP/IP protocol stack 205 (S1206), and the process ends (S1204).

In step S1209, when the received packet is a TCP data packet (NO of S1209), the reception packet decision unit 701 provides the TCP data packet to the address replacement unit 702 with an index port number. Referring to the index port number and the temporary IPMAC list 204 the address replacement unit 702 rewrites the transmission origin MAC address, the transmission origin IP address, the transmission origin port number, the destination MAC address, destination IP address, and destination port number of a TCP data packet are rewritten (S1212). Specifically, the transmission origin MAC address is replaced with a second temporary MAC address, the transmission origin IP address is replaced with a second temporary IP address, the destination MAC address is replaced by the outside NIC MAC address, the transmission origin port number is replaced by the index port number, and the destination port number is replaced by the outside NIC address, and the destination IP address is rewritten by a dynamic port number. After the address replacement unit 702 rewrites these values, it transmits the TCP data packet to the TCP/IP protocol stack 205 (S1206), and the process ends (S1204).

Figure 13:
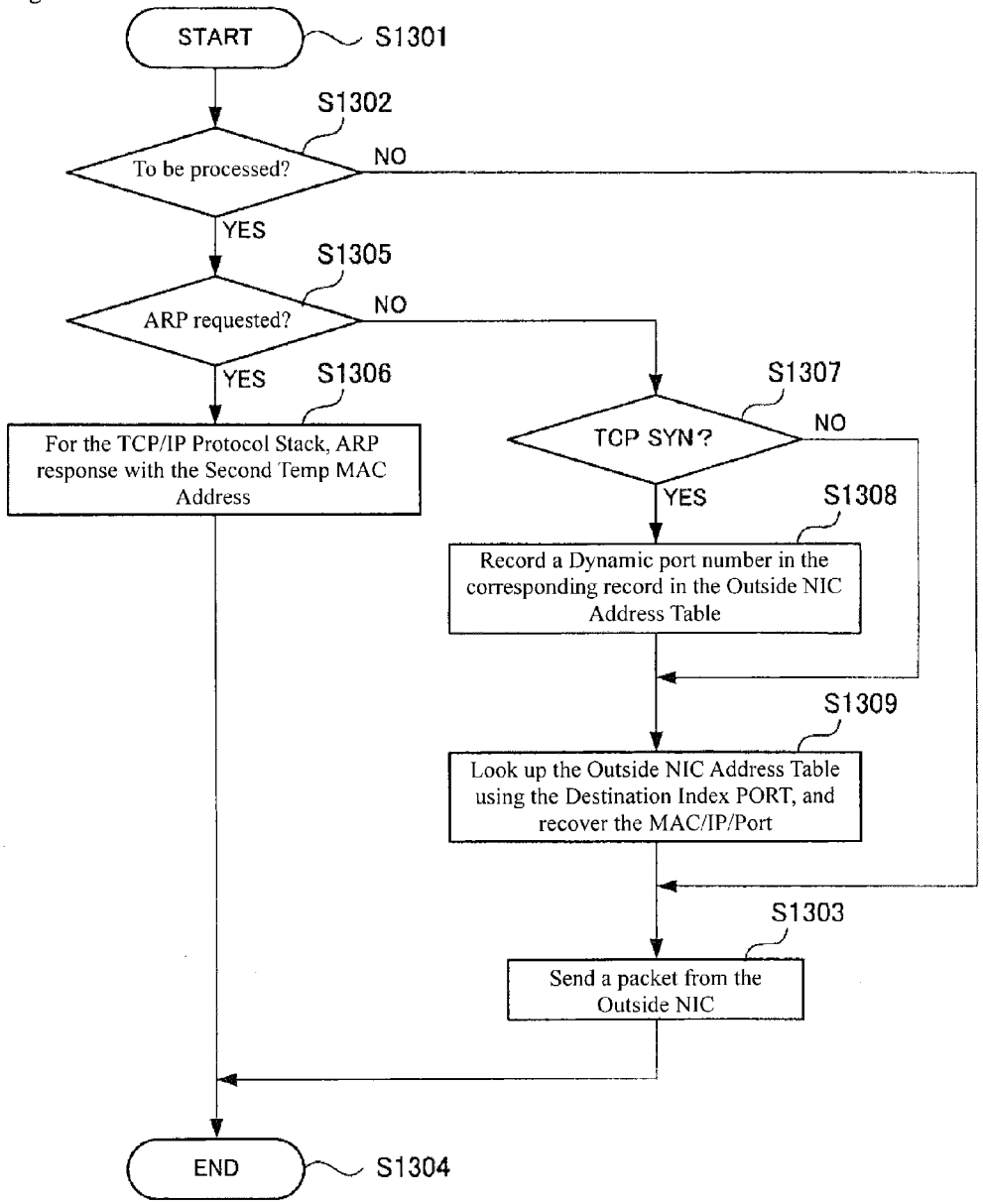
FIG. 13 is a flowchart of an outside NIC packet transmission process carried out in the address conversion unit according to the exemplary embodiment of the present advancements.

FIG. 13 is a flowchart of the packet transmission process of the outside NIC transmission processing unit 503. When the process is started (S1301), the transmission packet decision unit 801 initially analyzes the type and destination IP address of a packet received from the TCP/IP protocol stack 205. When the type of the packet is an ICMP packet, a UDP packet, or an ARP request packet and the IP address is not a second temporary IP address described in the temporary IPMAC list 204, or a TCP packet and the IP address is not the second temporary IP address described in the temporary IPMAC list 204, the XPTCP gateway apparatus 101 does not process the packet, and the packet is transmitted through the outside NIC 108 without modification (S1303). Then the process ends (S1304).

At step S1305 it is determined whether the type of the packet is a TCP packet and a destination IP address is a second temporary IP address described in the temporary IPMAC list 204, or whether the packet is an ARP request packet and a search IP address is a second temporary IP address described in the temporary IPMAC list 204 (YES of S1302). When the packet is an ARP request packet and a search IP address is a second temporary IP address described in the temporary IPMAC list 204 (YES of S1305), the ARP request packet is generated by the TCP/IP protocol stack 205 as a result of transmitting the packet with the artificial second temporary IP address. Therefore, the ARP request packet is not transmitted outside of the XPTCP gateway apparatus 101 by the outside NIC 108. Instead, the outside NIC 108 generates an ARP response packet and responds directly. Specifically, the transmission packet decision unit 801 provides the ARP request packet to the ARP response processing unit 802, which refers to its temporary IPMAC list 204 to generate an ARP response packet based on the second temporary MAC address, and returns this ARP response packet to the TCP/IP protocol stack 205 (S1306). After this the process ends (S1304).

When the packet received from the TCP/IP protocol stack 205 is a TCP packet and the destination IP address is a second temporary IP address described in the temporary IPMAC list 204 (NO of S1305), the packet is processed by the XPTCP gateway apparatus 101, by rewriting the MAC address, IP address, and port number previously attached to the packet. This is performed by the inside NIC reception processing unit 501.

The transmission packet decision unit 801 determines whether the packet received from the TCP/IP protocol stack 205 is a TCP SYN packet (S1307). If the packet is a TCP SYN packet (YES of S1307), the TCP SYN packet identifies a newly produced connection. When the TCP/IP protocol stack 205 produced the new connection, the dynamic port number was automatically provided as a transmission origin port number. Therefore, it is necessary to store this dynamic port number in the outside NIC address table 210. The transmission packet decision unit 801 provides the TCP SYN packet to the dynamic port record processing unit 803, which acquires the transmission origin port number of the TCP SYN packet. The outside NIC address table 210 is searched with the index port number and the transmission origin port number of the TCP SYN packet acquired previously is written in the dynamic port number field of an identified record (S1308). In this way, the IP address etc., of the packet which goes through the new connection can be correctly substituted or restored by referring to the dynamic port number attached to the TCP SYN packet.

The dynamic port record processing unit 803 provides the TCP SYN packet to the address recovery unit 802, after recording the dynamic port number. Referring to the record of the outside NIC address table 210, which the dynamic port recording process part 803 identified previously, the address recovery unit 802 rewrites the transmission origin MAC address, the transmission origin IP address, the transmission origin port number, the destination MAC address, destination IP address, and destination port number of the TCP SYN packet (S1309). Then the TCP SYN packet is transmitted through outside NIC 108 (S1303), and the process ends (S1304).

In step S1307, if the packet received from the TCP/IP protocol stack 205 is not a TCP SYN packet (NO of S1307), the transmission packet decision unit 801 provides the TCP packet to the address recovery unit 902. The address recovery unit 802 searches the records of the outside NIC address table 210 with the index port number of the TCP packet, and identifies a record. The transmission origin MAC address, the transmission origin IP address, the transmission origin port number, the destination MAC address, destination IP address, and destination port number of a TCP packet are then restored (S1309), and the TCP SYN packet is transmitted through outside NIC 108 (S1303). The process then ends (S1304).

Figure 14:
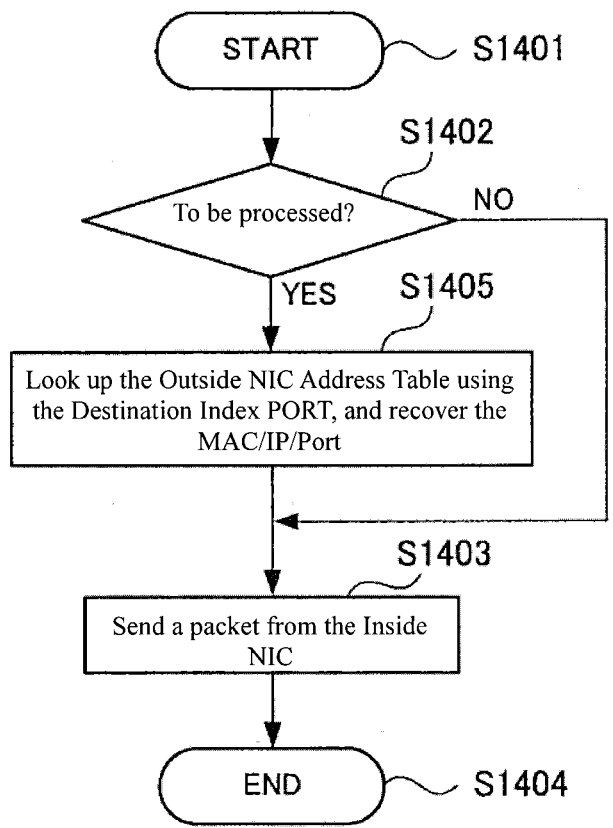
FIG. 14 is a flowchart of an inside NIC packet transmission process carried out in the address conversion unit according to the exemplary embodiment of the present advancements.

FIG. 14 is a flowchart of the operation of inner side NIC transmission processing unit 504. When the process is started (S1401), the transmission packet decision unit 901 initially analyzes the type and the destination IP address of a packet received from the TCP/IP protocol stack 205. If the type of the packet is an ICMP packet, an ARP packet, and a UDP packet, or the type of the packet is a TCP packet and the packet does not include the first temporary IP address described in the IPMAC list 204 (NO of S1402), it is not processed by the XPTCP gateway apparatus 101. Instead, the packet is transmitted through the inside NIC 104 without modification (S1403), and the process ends (S1404).

In step S1402, when the type of the packet received from the TCP/IP protocol stack 205 is a TCP packet and a destination IP address thereof is a first temporary IP address described in the temporary IPMAC list 204 (YES of S1402), the packet is processed by the XPTCP gateway apparatus 101, by rewriting the MAC address, IP address, and port number attached to the packet back to their original state. This is performed by the inside NIC transmission processing unit 504. Specifically, the transmission packet decision unit 901 provides the TCP packet to the address recovery unit 902. The address recovery unit 902 searches the records of the inside NIC address table 209 with the index port number of the TCP packet, and identifies a record. The transmission origin MAC address, the transmission origin IP address, the transmission origin port number, the destination MAC address, destination IP address, and the destination port number of a TCP packet are then restored (S1405), and the TCP SYN packet is transmitted through the inside NIC 104 (S1403). After that the process ends (S1404).

Figure 15:
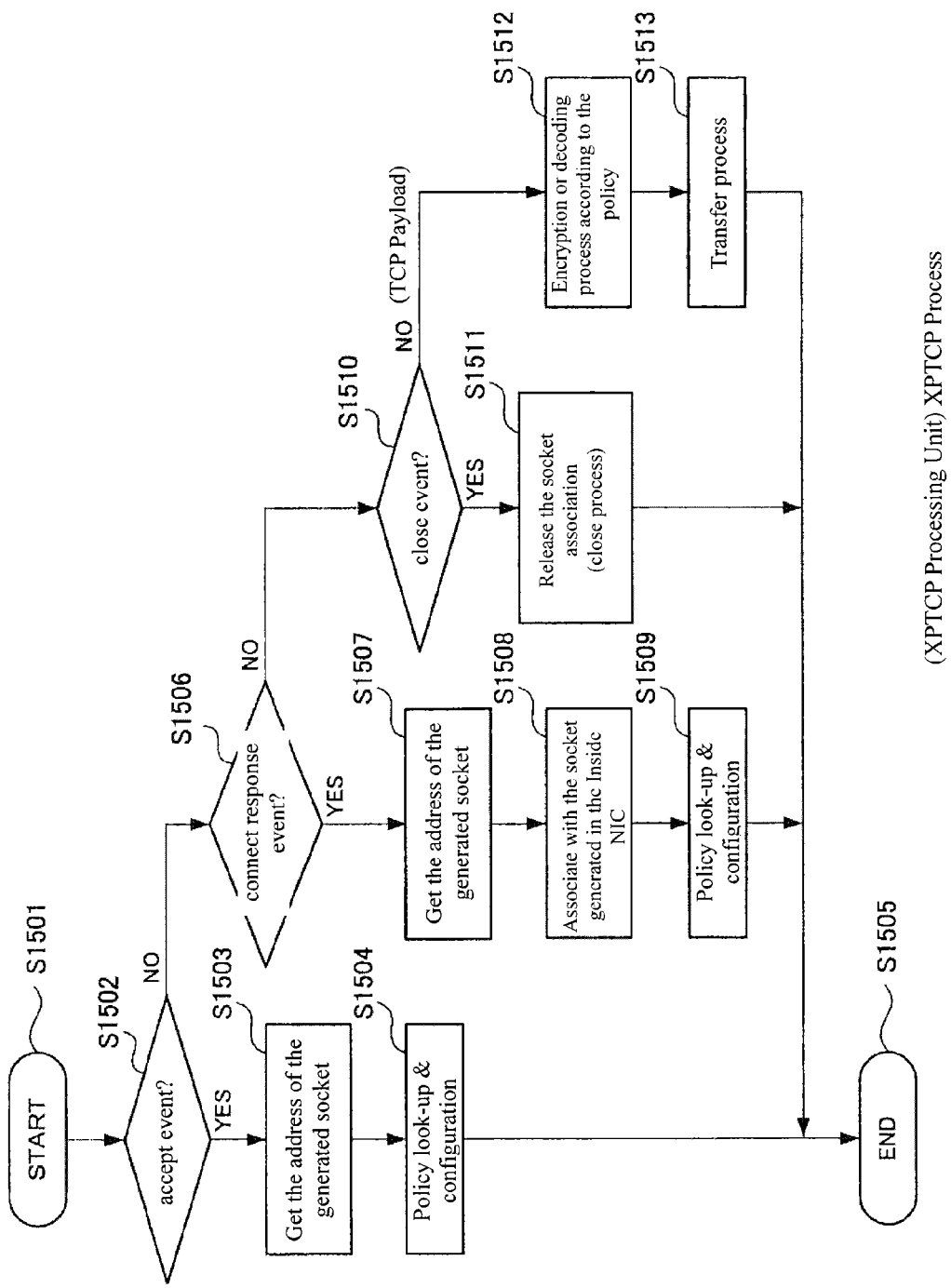
FIG. 15 is a flowchart of an XPTCP process carried out in the XPTCP processing unit according to the exemplary embodiment of the present advancements.

Next, the operation of the XPTCP processing unit 206 of the XPTCP gateway apparatus 101 is explained with reference to FIG. 15. The XPTCP process performs predetermined authentication and encryption of TCP or UDP packets in the transport layer of the OSI model. This is described with respect to the socket process of the above-described address conversion processing unit 203 and the socket processing unit 207 described below.

The process starts by checking whether the event detection unit 1001 has detected an accept event relative to the connection established using the inside NIC 104 by the socket processing unit 207 (S1502). If an "accept" event is detected (YES of S1502), the event detection unit 1001 controls the socket memory operation unit 1002 to acquire a generated socket from the address in the socket memory area 1004 based on the accept event (S1503). The event detection unit 1001 then starts the policy configuration unit 1003, which checks for a policy with respect to the address conversion unit 203 using an index port number corresponding to the socket that was generated based on the accept event. The policy replying unit 506 of the address conversion unit 203 searches the inside NIC address table 209 with the index port number, and identifies a record, and the XPTCP processing object master 208 is searched using the transmission origin IP address, the port number, destination IP address, and port number of the identified record to identify a record therein. If the record number of the record is acquired, the record number will be provided to the policy configuration part 1003 in response. The policy configuration part 1003 records the record number and index port number which were obtained on the XPTCP policy table 211, and links them. Then, the encryption processing unit 1005 identifies the record of the XPTCP processing object master 208 using the index port number as a key, and sets the encryption policy accordingly (S1504). After that the process ends (S1505).

In step S1502, if an accept event is not detected (NO of S1502), it is determined whether the event detection unit 1001 has detected a connect response event related to the connection established through the outside NIC 108 by the TCP/IP protocol stack 205 (S1506). If a connect response event is detected (YES of S1506), the event detection unit 1001 controls the socket memory operation unit 1002 to acquire the address in the socket memory area 1004 corresponding to the generated socket based on the connect response event (S1507).

Next, the event detection unit 1001 correlates the socket corresponding to the connection through the outside NIC 108 with the socket related to the connection through the inside NIC 104 which shares the same index port number (S1508). At this time, the decoding processing unit 1006 identifies the record of the XPTCP processing object master 208 using the index port number as a key, and sets the decoding policy (S1509). Then processing ends (S1505).

The data stream obtained from the socket corresponding to the connection through the inside NIC 104 is encrypted through the encryption processing unit 1005, and the encrypted data stream is output to the socket corresponding to the connection through the outside NIC 108. Moreover, the data stream obtained from the socket corresponding to the connection through the outside NIC 108 is decoded through the decoding processing unit 1006, and the decoded data stream is output to the socket corresponding to the connection through the inside NIC 104.

In step S1506, if a connect response event is not detected (NO of S1506), it is checked whether the event detection unit 1001 has detected a close event corresponding to the connection through the outside NIC 108 by the TCP/IP protocol stack 205 (S1510). If a close event is detected (YES of S1510), the event detection unit 1001 controls the socket memory operation unit 1002 to release the corresponding sockets, and the applicable records of the XPTCP policy table 211 are deleted (S1511). Then the process ends (S1505).

In step S1510, if a close event is not detected (NO of S1510), no further event detection is performed by the event detection unit 1001. Instead, the encryption processing unit 1005 and the decoding processing unit 1006 receive a data stream from the socket memory operation unit 1002, and perform either encryption or decoding based on the encryption or the decoding policy identified in the XPTCP policy table 211 (S1512). The socket memory operation unit 1002 transfers the processed data stream (S1513), and the process ends (S1505).

Figure 16:
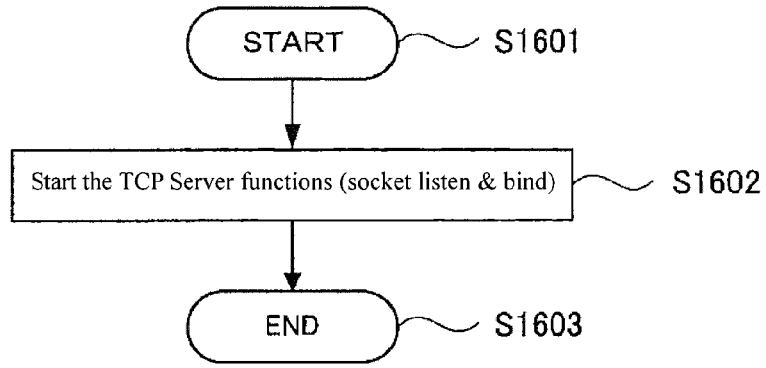
FIG. 16 is a flowchart of initialization process carried out in a socket processing unit according to the exemplary embodiment of the present advancements.

Next, operation of the socket processing unit 207 of the XPTCP gateway apparatus 101 is explained with reference to FIG. 16. When the process is started (S1601), the socket processing unit 207 starts a TCP server function for a predetermined port number (S1602). At this time, a socket to receive a request through the inside NIC 104 is created (socket function), and a port number is defined for the socket (bind function). The process then ends (S1603).

Figure 17:
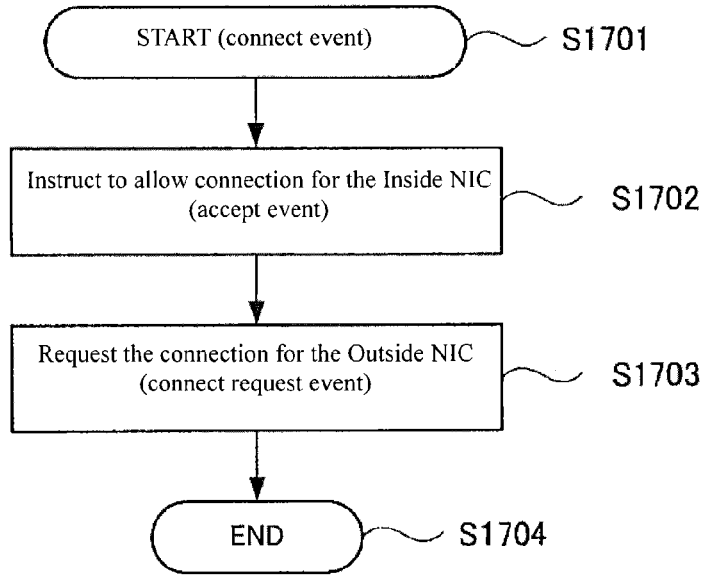
FIG. 17 is a flowchart of a connection request transfer process carried out in the socket processing unit according to the exemplary embodiment of the present advancements.

FIG. 17 is a flowchart of a connection request transfer process of the socket processing unit 207. The socket processing unit 207 issues an accept event approving a connection through the inside NIC 104 via a socket in response to a connect event received from the TCP/IP protocol stack 205 (S1301) (S1702). In this case, the socket processing unit 207 functions as a server. Next, the socket processing unit 207 issues a connect request requesting a connection through the outside NIC 108 (S1703). In this case, the socket processing unit 207 behaves as a client. The process then ends (S1704).

Figure 18:
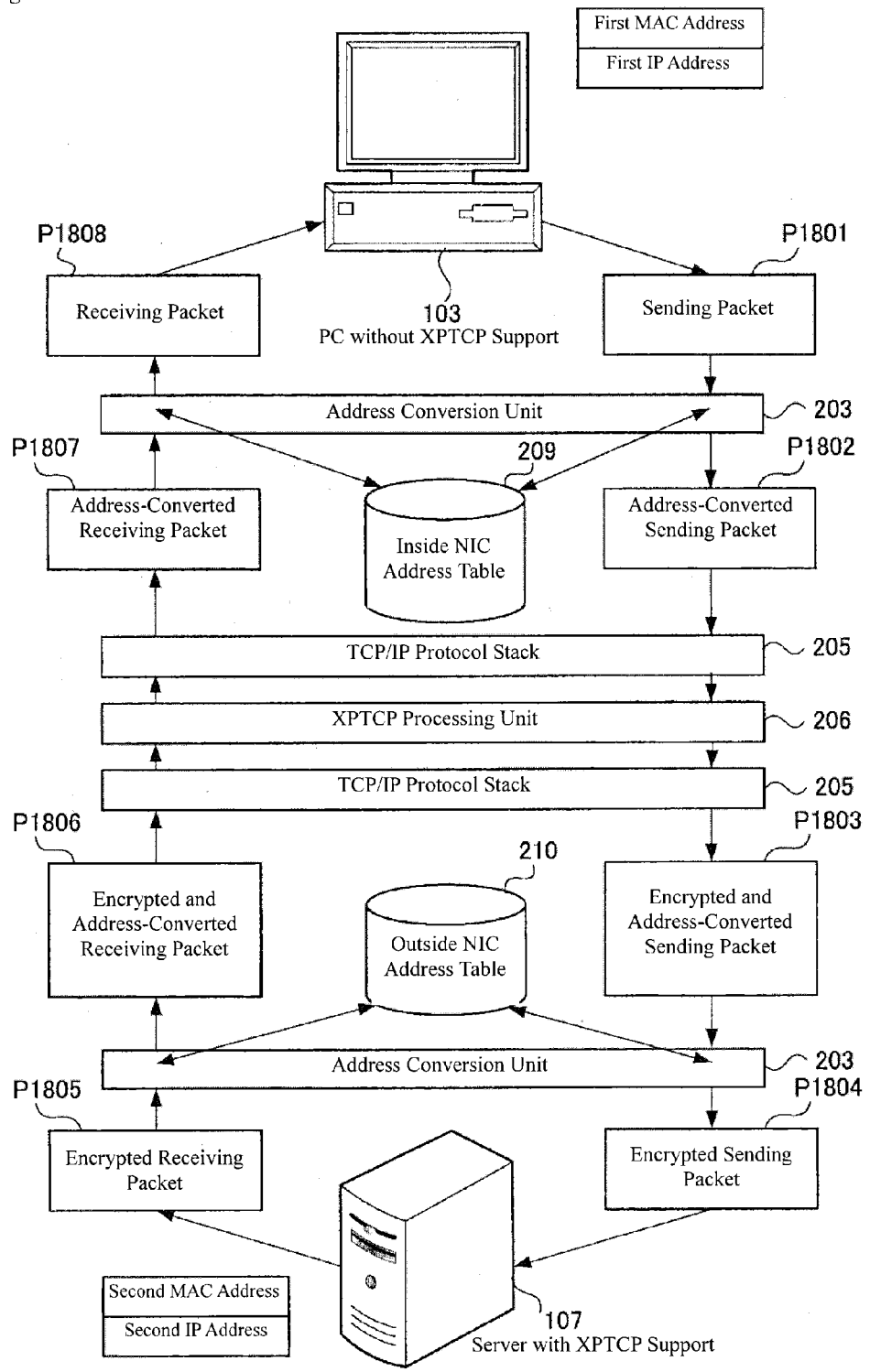
FIG. 18 is a schematic of packet modification in the XPTCP gateway apparatus according to the exemplary embodiment of the present advancements.
Figure 19:
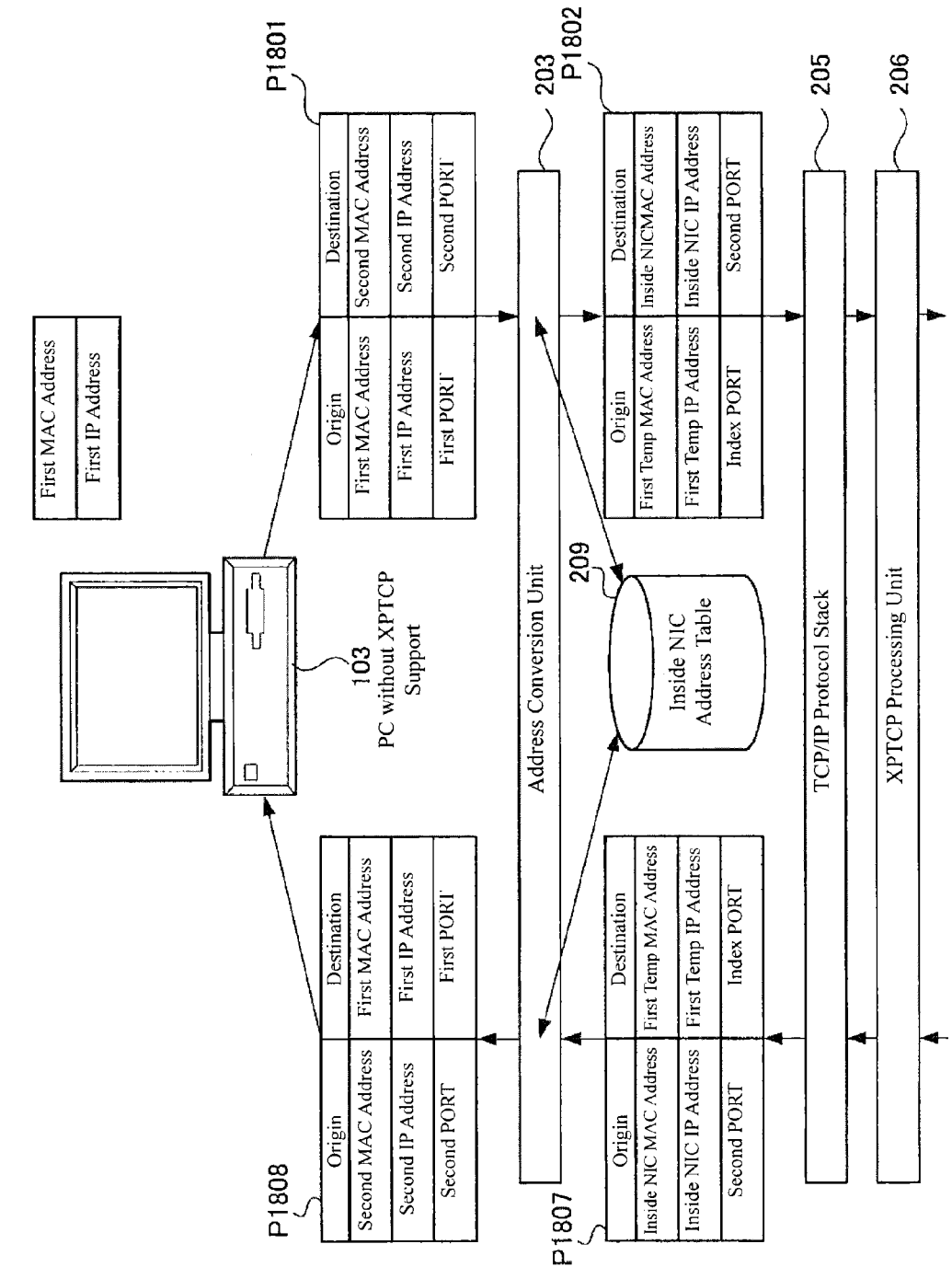
FIG. 19 is a detail schematic of the first half of packet modification in the XPTCP gateway apparatus according to the exemplary embodiment of the present advancements.
Figure 20:
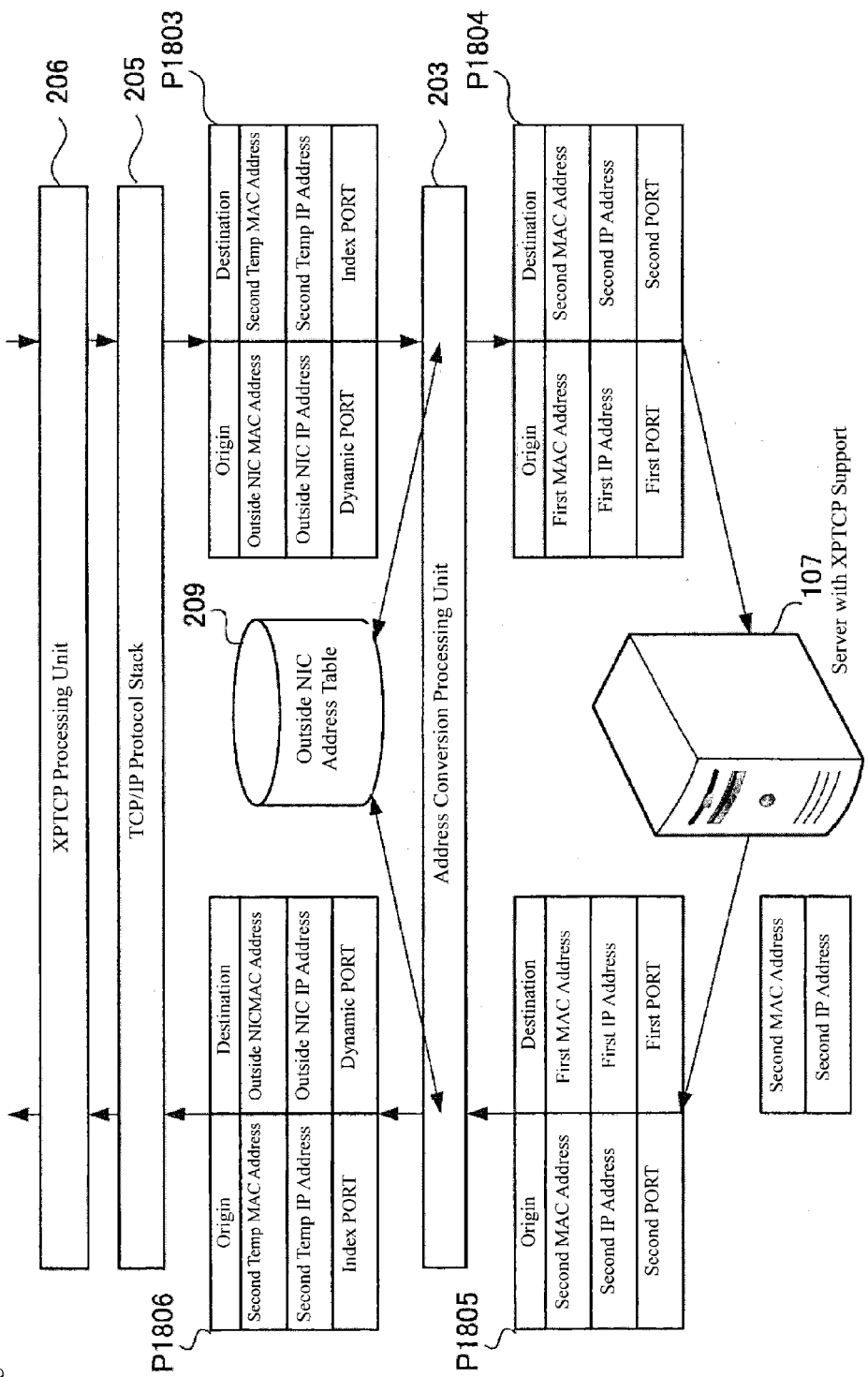
FIG. 20 is a detail schematic of the second half of packet modification in the XPTCP gateway apparatus according to the exemplary embodiment of the present advancements.

FIGS. 18-20 are schematics illustrating how a packet is modified as it travels through the XPTCP gateway apparatus 101. The first MAC address and the first IP address are provided to PC 103, which does not support XPTCP. The second MAC address and the second IP address are provided to the server 107, which supports XPTCP. When a packet is transmitted to the server 107 from the PC 103, the packet reaches the address conversion unit 203 through the inside NIC 104. The address conversion unit 203 performs an address conversion process with reference to the inside NIC address table 209 to generate a converted packet. The destination IP address of the converted packet is an IP address of the inside NIC 104. The TCP/IP protocol stack 205 then receives the converted packet and strips the packet headers in order of a MAC header, IP header, and TCP header, and the payload data stream is restored. The restored data stream is provided to the XPTCP processing unit 206 through a socket, and the XPTCP processing unit 206 performs a predetermined encryption process on the data stream. Then the encrypted data stream is supplied to the socket created for the outside NIC 108.

The TCP/IP protocol stack 205 divides the encrypted data stream into predetermined byte lengths, adds a TCP header, IP header, and a MAC header to each in order to create transmission packets. That is, the destination IP address of the transmission packet created at this time is a second temporary IP address, not the IP address of the server 107 for which the packet is destined. Then, the address conversion unit 203 performs an address restoration process with reference to the outside NIC address table 210. Then, with encryption and address conversion complete, the transmission packet is transmitted to and received by the server 107.

When an encrypted packet is transmitted to the PC 103 from the server 107, the encrypted packet is received by the address conversion processing unit 203 through the outside NIC 108. The address conversion unit 203 performs an address conversion process with reference to the outside NIC address table 210. The destination IP address of the encrypted packet is an IP address of the outside NIC 108. Therefore, the TCP/IP protocol stack 205 receives the encrypted packet after address conversion, and strips the packet's headers in order of a MAC header, IP header, and a TCP header, and restores the payload of encrypted data stream. The restored encryption data stream is provided to the XPTCP processing unit 206 through a socket. The XPTCP processing unit 206 performs a predetermined decoding process on the encrypted data stream, and the decoded data stream is supplied to the socket of the outside NIC 108.

The TCP/IP protocol stack 205 divides the decoded stream data into predetermined byte lengths, and adds a TCP header, IP header, and a MAC header, to create the received packets. That is, the destination IP address of the packets created at this time is a first temporary IP address, and is not the IP address of the PC 103, which is the original destination. The address conversion unit 203 then performs an address restoration process with reference to the inside NIC address table 209, and the packet is transmitted to its final destination, PC 103.

Figure 21:
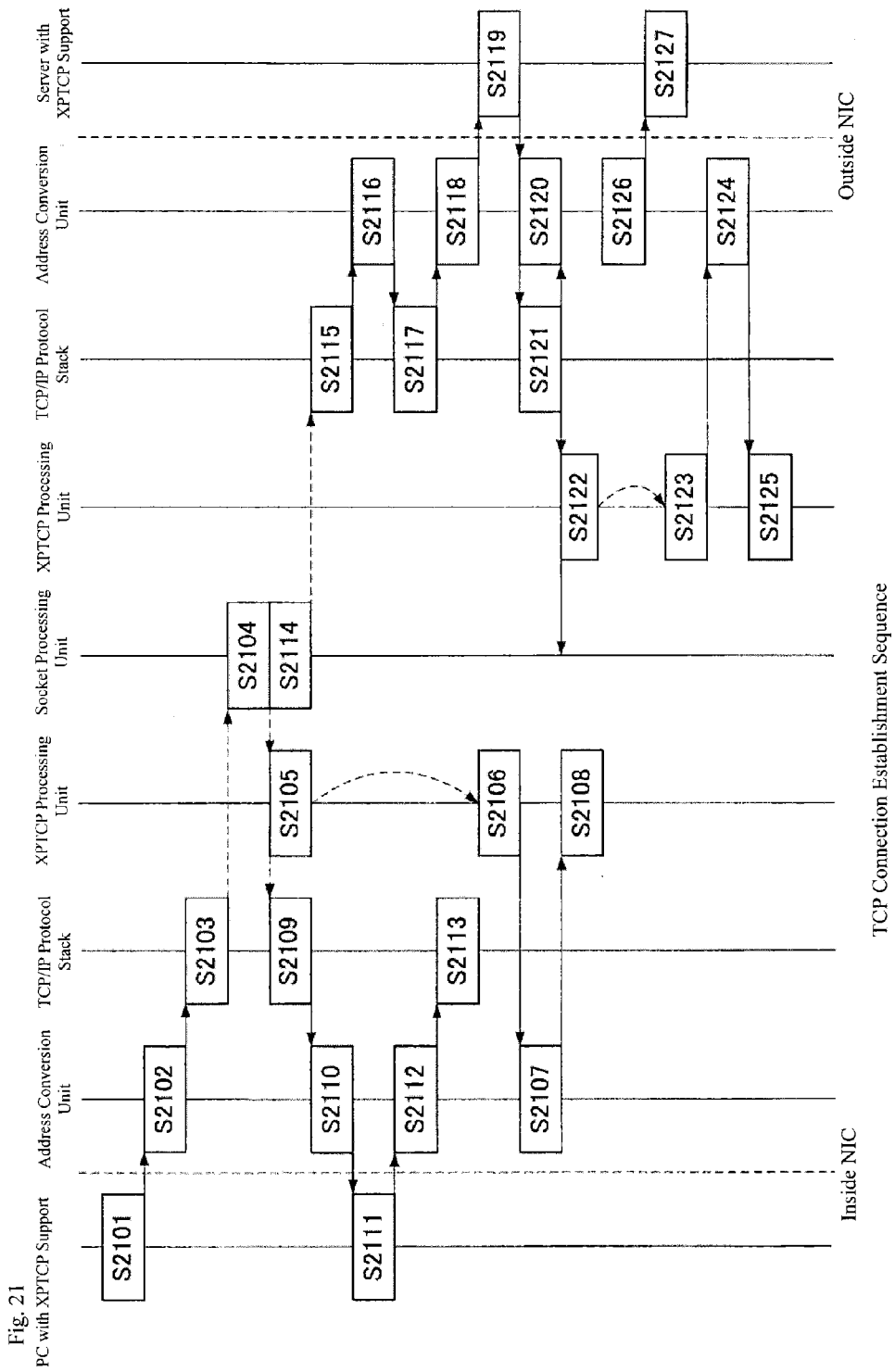
FIG. 21 is a timing diagram of XPTCP connection establishment according to the exemplary embodiment of the present advancements.
Figure 22:
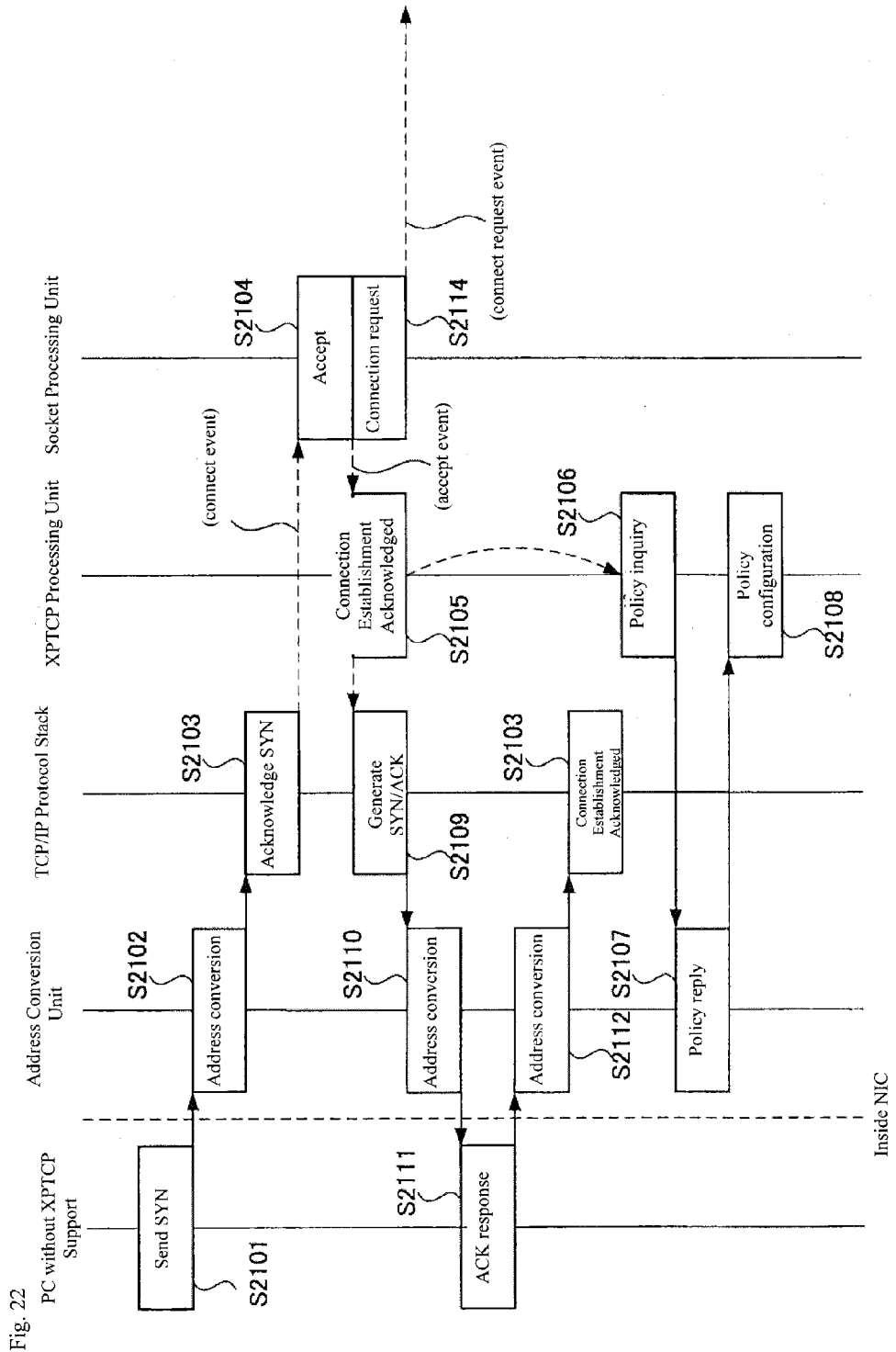
FIG. 22 is a timing diagram of the first half of establishing an XPTCP connection according to the exemplary embodiment of the present advancements.
Figure 23:
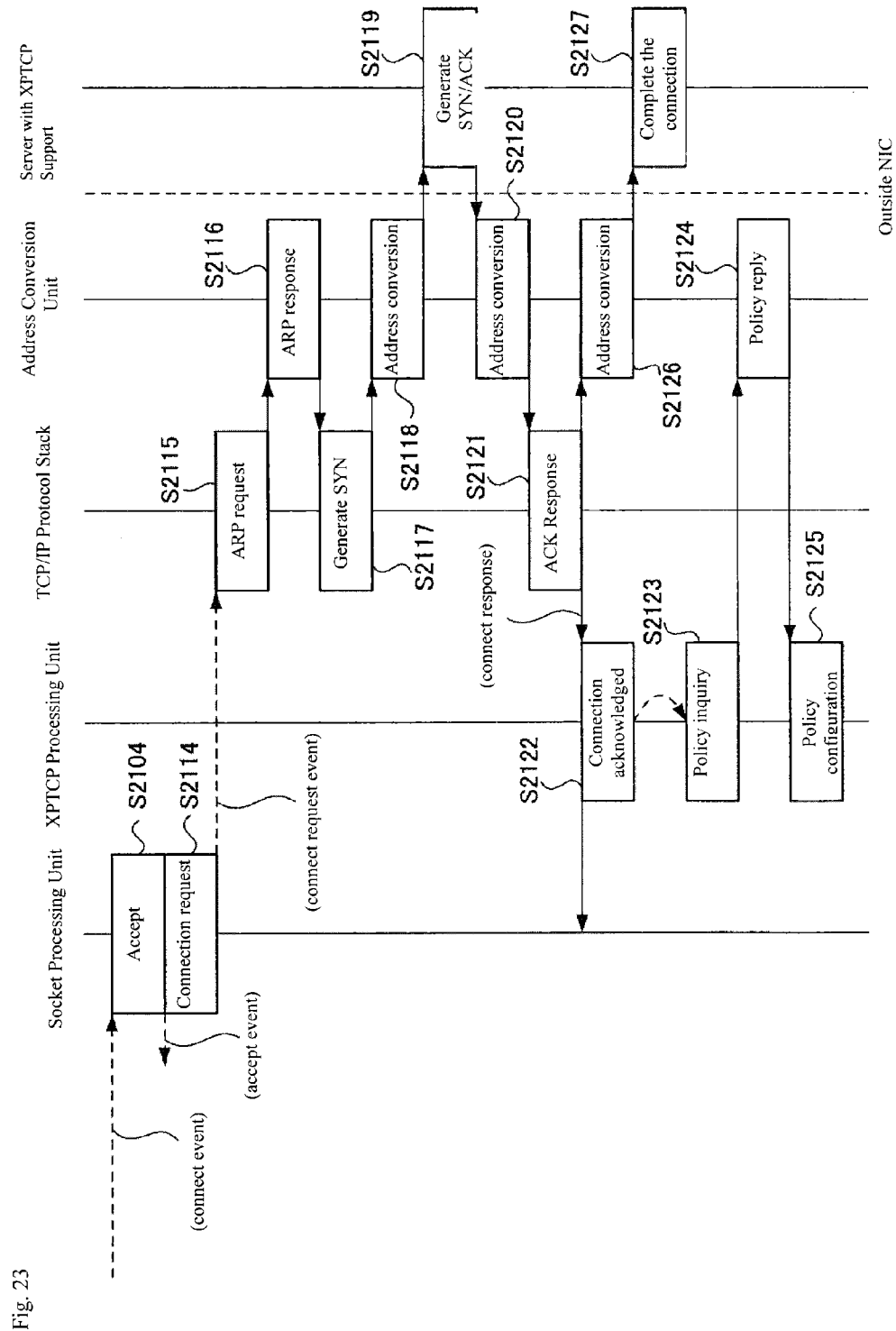
FIG. 23 is another timing diagram of the second half of establishing an XPTCP connection according to the exemplary embodiment of the present advancements.

FIGS. 21-23 are timing diagrams of the TCP connection establishment sequence in the XPTCP gateway apparatus 101. FIG. 21 is a overview, FIG. 22 illustrates the first half of the TCP connection establishment sequence, and FIG. 23 illustrates the second half of the TCP connection establishment sequence. Responsive to a TCP SYN packet transmitted from the terminal, the figures illustrate the transitions and operations of the XPTCP gateway apparatus 101 in order to form a TCP connection between the server and the XPTCP gateway apparatus 101 and between the terminal and the XPTCP gateway apparatuses 101. In other words, the XPTCP gateway apparatus 101 performs this sequence to establish communication between the server and the terminal.

A device that does not support XPTCP, such as PC 103, operates application programs, such as a web browser, any may connect to a device that supports XPTCP, such as server 107. In that case, PC 103 starts the application program, and transmits a TCP SYN packet (S2101). The TCP SYN packet reaches the address conversion unit 203 through the inside NIC 104. The inside NIC reception processing unit 501 of the address conversion unit 203 converts the transmission origin IP and MAC address, the destination MAC address, IP address, and port number of the TCP SYN packet (S2102). In addition, a new record is created in the inside NIC address table 209, and an index port number corresponding to the new record is obtained.

The TCP SYN packet to which the address conversion process was performed is then provided to the TCP/IP protocol stack 205. The TCP/IP protocol stack 205 recognizes the TCP SYN packet based on the port number and issues a connect event to the socket processing part 207 in order to create a connection (S2103). The socket processing part 207, using its server function, issues an accept event (connection approval) in response to the connect event to the TCP/IP protocol stack 205 (S2104).

The XPTCP processing unit 206 recognizes the accept event and formation of the connection towards the inside NIC 104 (S2105), and searches for the policy applied to the connection, using the index port number assigned by the address conversion unit 203, in the XPTCP processing object master 208 and the inside NIC address table 209 (S2106). The record number of the XPTCP processing object master 208 is sent in reply to the search (S2107). The XPTCP processing unit 206 registers and links the record number and the index port number in the XPTCP policy table 211, and sets the policy of the decoding processing unit 1006 (S2108).

The accept event issued in step S2104 is then received by the TCP/IP protocol stack 205, which generates TCP ACK/SYN packet (S2109). The TCP ACK/SYN packet is received at the address conversion unit 203. The inside NIC transmission processing unit 504 of the address conversion unit 203 restores the transmission origin, the destination MAC address, IP address, and port number of the TCP ACK/SYN packet (S2110). Then the TCP ACK/SYN packet is sent to the PC 103 through the inside NIC 104. The PC 103 receives the TCP ACK/SYN packet, and responds with a TCP ACK packet (S2111).

The TCP ACK packet is received at the address conversion unit 203 through the inside NIC 104. The inside NIC reception processing unit 501 of the address conversion unit 203 converts the transmission origin IP and MAC address, the destination MAC address, IP address, and port number of the TCP ACK packet (S2112).

After the address conversion process, the TCP ACK packet is sent to the TCP/IP protocol stack 205, which recognizes that the connection was established based on the arrival of the TCP ACK packet (S2113). The connection is thus made, and TCP data packets can then be transmitted and received through the connection.

The socket processing unit 207 issues the accept event while acting as a server with respect to the inside NIC 104 in step S2104, and issues the connect request event while acting as a client with respect to the outside NIC 108 in step S2114. The TCP/IP protocol stack 205 receives a connect request event, and generates an ARP request packet (S2115), which is sent to the address conversion unit 203. The outside NIC transmission processing unit 503 of the address conversion unit 203 generates the ARP response packet in response to the ARP request packet, and sends it to the TCP/IP protocol stack 205 (S2116). When the TCP/IP protocol stack 205 receives the ARP response packet, it generates the TCP SYN packet (S2117). The TCP SYN packet is sent to the address conversion unit 203. The outside NIC transmission processing unit 503 of the address conversion unit 203 rewrites the transmission origin IP and MAC addresses, the destination MAC address, IP address, and port number of the TCP SYN packet (S2118). In addition, a dynamic port number is automatically attached to the applicable record of the outside NIC address table 210 by the TCP/IP protocol stack 205 as a transmission origin port number.

The TCP SYN packet is then sent to the server 107 through the outside NIC 108, and the server 107 responds with a TCP ACK/SYN packet (S2119). The TCP ACK/SYN packet is received by the address conversion unit 203 through the outside NIC 108. The outside NIC reception processing unit 502 of the address conversion unit 203 rewrites the transmission origin IP and MAC addresses, the destination MAC address, IP address, and port number of the TCP ACK/SYN packet (S2120). Then, the TCP ACK/SYN packet is sent to the TCP/IP protocol stack 205, which responds with a TCP ACK packet (S2121). At this time, the TCP/IP protocol stack 205 notifies a connect response event to the socket processing unit 207, which is acting as a client program.

The XPTCP processing unit 206 recognizes the connect response event and formation of the connection to the outside NIC 108 (S2122), and inquires whether a policy is applied to the connection using an index port number assigned by the address conversion unit 203 (S2123). The inquiry is made by referring to the XPTCP processing object master 208 and the inside NIC address table 209 of the address conversion unit 203, and a record number of the XPTCP processing object master 208 is acquired as a result (S2124). The XPTCP processing unit 206 registers and links the record number and an index port number in the XPTCP policy table 211, and sets the policy of the encryption processing unit 1005 accordingly (S2125).

The TCP ACK packet issued from the TCP/IP protocol stack 205 in step S2121 is received by the address conversion unit 203. The outside NIC transmission processing unit 503 of the address conversion unit 203 then restores the transmission origin IP and MAC addresses, the destination MAC address, IP address, and port number of the TCP ACK packet (S2126), which is then sent to the server 107 through outside NIC 108. The server 107 recognizes that the connection was established by based on the receipt of the TCP ACK packet (S2127). TCP data packet transmission/reception can then be performed through the connection.

Figure 24:
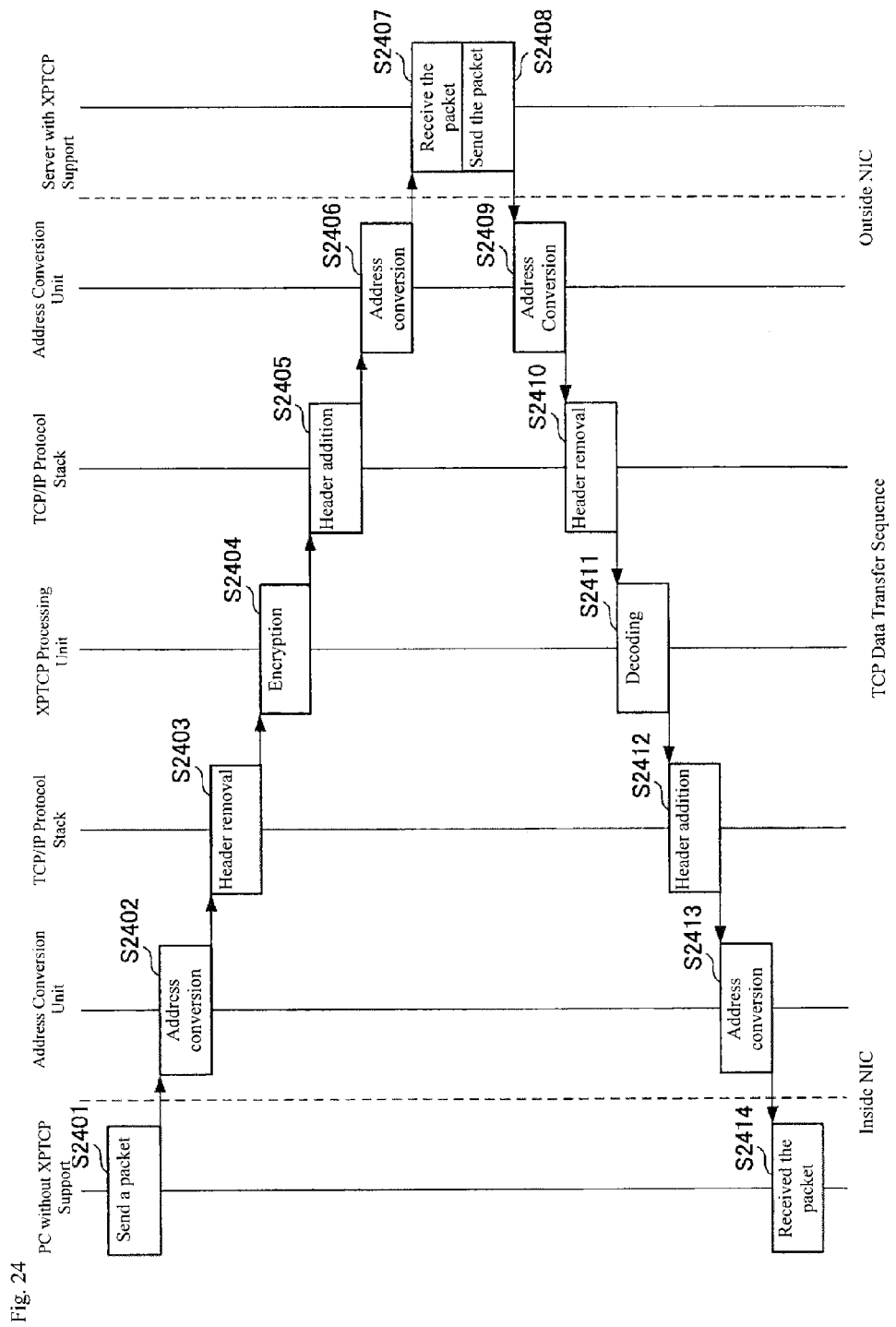
FIG. 24 is a timing diagram a TCP data transfer sequence through the XPTCP gateway apparatus according to the exemplary embodiment of the present advancements.

FIG. 24 is a timing diagram of the TCP data transmission sequence in the XPTCP gateway apparatus 101. This chart corresponds to the process carried out in the XPTCP gateway apparatus 101 to form connections between the XPTCP gateway apparatus and a server, and between the XPTCP gateway apparatus and a terminal, when the terminal transmits a TCP packet.

The PC 103 operates application programs, such as a web browser, when it transmits data to the server 107. Specifically, the PC 103 starts an application program, and transmits a TCP data packet (S2401) to the address conversion unit 203 through the inside NIC 104. The inside NIC reception processing unit 501 of the address conversion unit 203 rewrites the transmission origin IP and MAC addresses, the destination MAC address, IP address, and port number of the TCP data packet (S2402).

The TCP data packet is then sent to the TCP/IP protocol stack 205, which removes the header of the TCP data packet, and assembles the TCP data packet payload into a data stream (S2403). An encryption process is performed by the XPTCP processing unit 206 on the data stream, and the data stream is then transferred to the socket of the outside NIC 108 (S2404). After this, the data stream is received by the TCP/IP protocol stack 205, which segments the stream data in predetermined byte lengths, and adds headers to each segment to generate TCP data packets (S2405).

The TCP data packet is then sent to the address conversion unit 203. The outside NIC transmission processing unit 503 of the address conversion unit 203 rewrites the transmission origin IP and MAC addresses, the destination MAC address, IP address, and port number of the TCP data packet (S2406). After this, the TCP data packet is sent to the server 107 through the outside NIC 108 (S2407). After the server 107 receives the TCP data packet and performs a predetermined process, it transmits the TCP data packet to the PC 103 as a reply (S2408).

The reply TCP data packet is then received by the address conversion unit 203 through the outside NIC 108. The outside NIC reception processing unit 502 of the address conversion unit 203 rewrites the transmission origin IP and MAC address, the destination MAC address, IP address, and port number of the TCP data packet (S2409). Afterwards, the TCP data packet is sent to the TCP/IP protocol stack 205, which removes the header and assembles the packet payload into a data stream (S2410). A decoding process is performed by the XPTCP processing unit 206 on the data stream, and the results are transferred to the socket of inside NIC 104 (S2411).

After decoding, the data stream is sent to the TCP/IP protocol stack 205, which segments the data stream into predetermined byte lengths, and adds headers to generate a TCP data packet (S2412). The TCP data packet is then sent to the address conversion unit 203. The inside NIC transmission processing unit 504 of the address conversion unit 203 rewrites the transmission origin IP and MAC addresses, the destination MAC address, IP address, and port number of the TCP data packet (S2413), and the TCP data packet is sent to the PC 103 through the inside NIC 104 (S2414).

Figure 25:
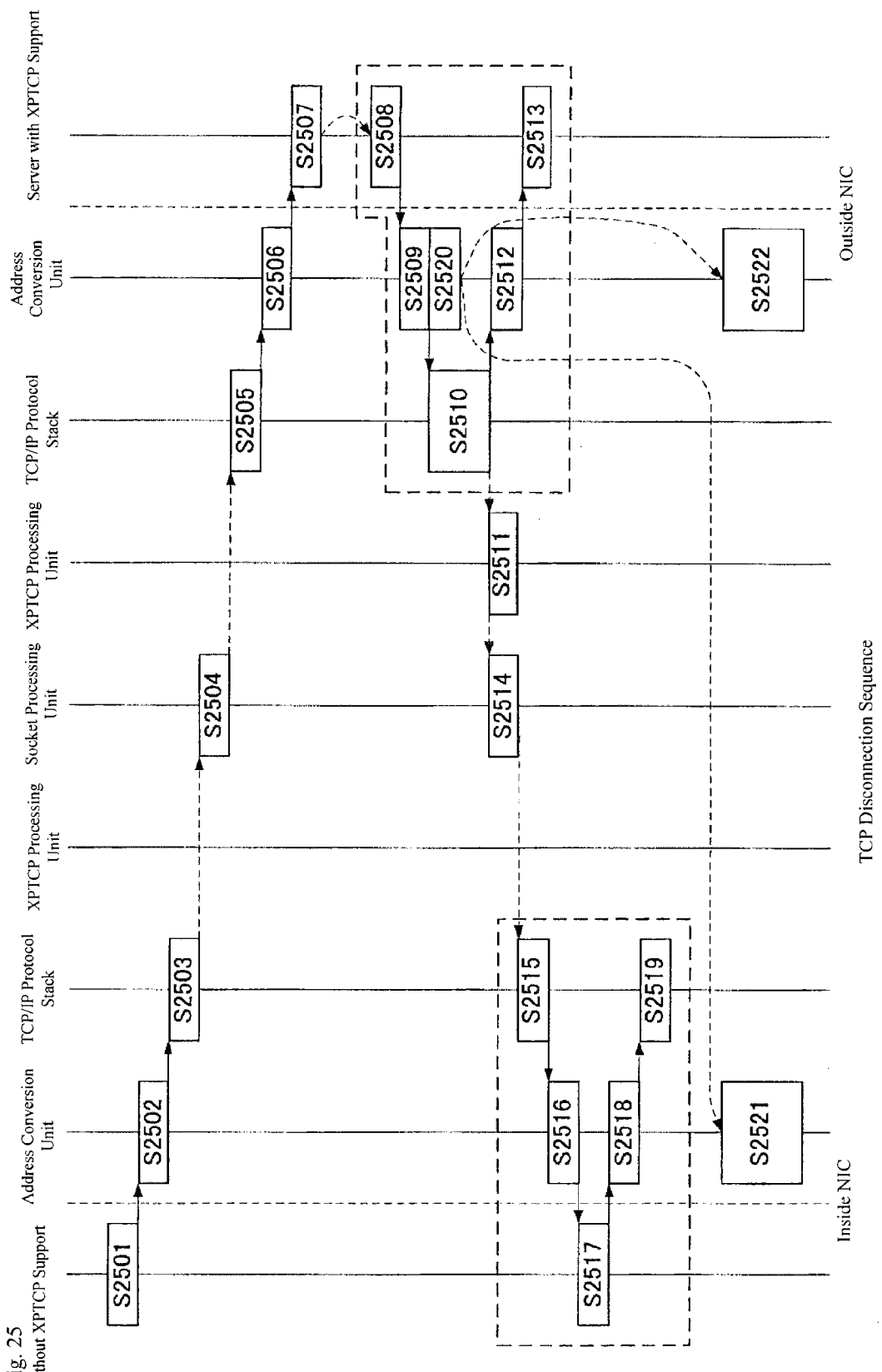
FIG. 25 is a timing diagram of disconnecting an XPTCP connection in an XPTCP gateway apparatus according to the exemplary embodiment of the present advancements.
Figure 26:
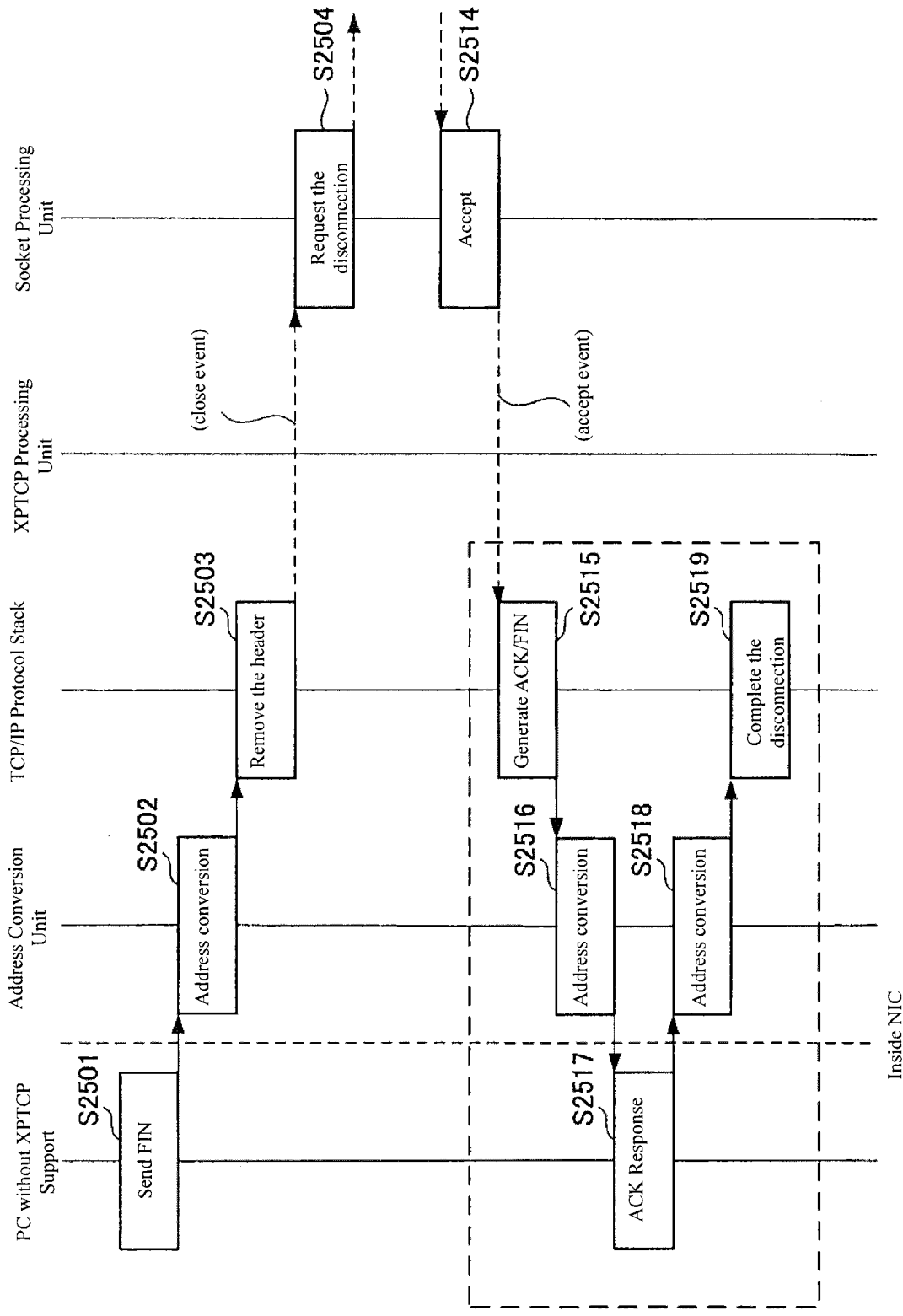
FIG. 26 is a timing diagram of the first half of disconnecting the XPTCP connection in the XPTCP gateway apparatus according to the exemplary embodiment of the present advancements.
Figure 27:
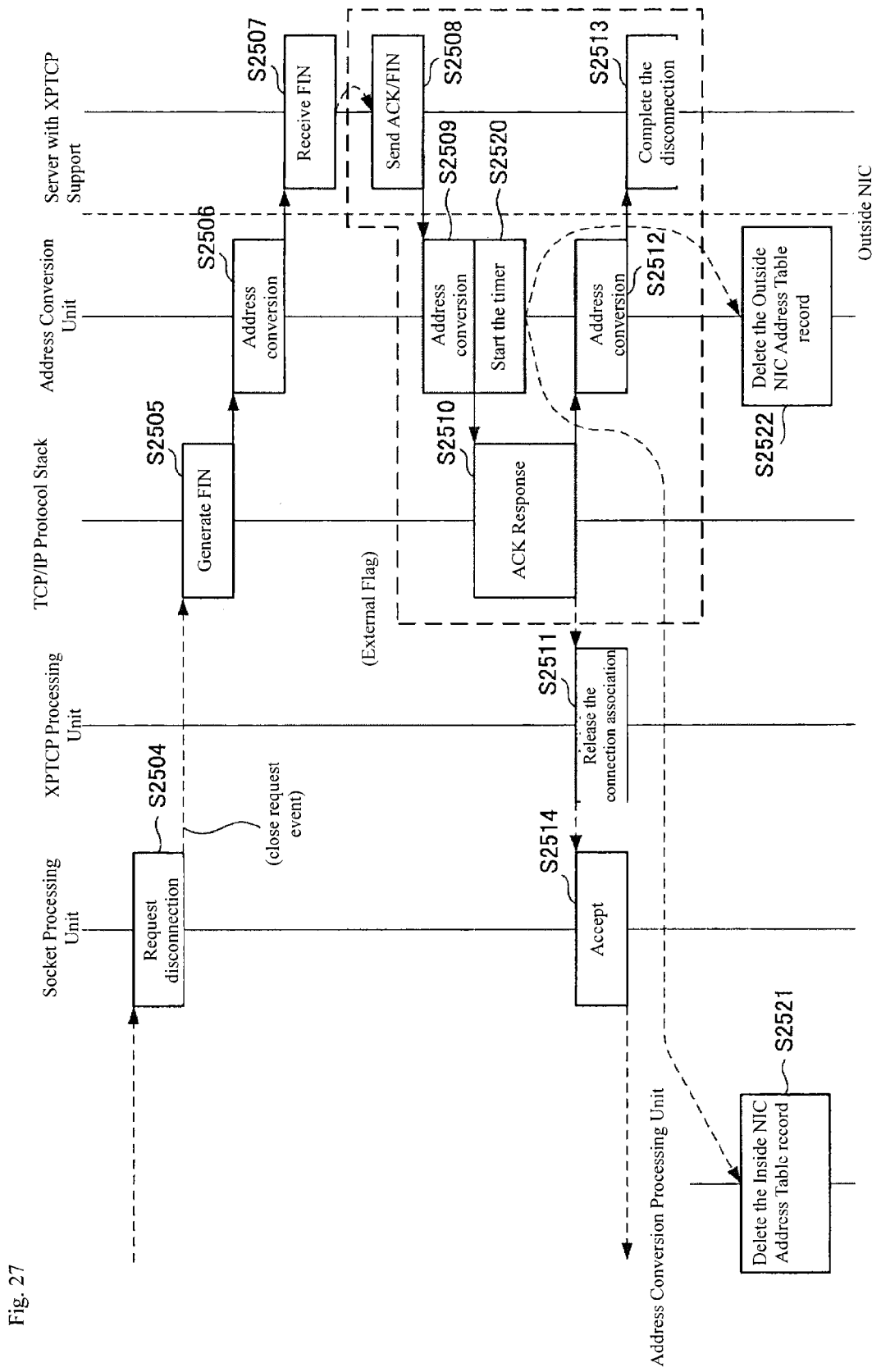
FIG. 27 is a timing diagram of the second half of disconnecting the XPTCP connection in the XPTCP gateway apparatus according to the exemplary embodiment of the present advancements.

FIGS. 25-27 are timing diagrams of the TCP disconnect sequence used by the XPTCP gateway apparatus 101 to end a communication session. FIG. 25 is an overview of the process, FIG. 26 illustrates the processing in the first half of the disconnect sequence, and FIG. 27 illustrates the processing in the second half of the disconnect sequence. In response to a TCP FIN packet transmitted from the terminal, the XPTCP gateway apparatus 101 performs a series of operations to close the current TCP connection between a server and the XPTCP gateway apparatus 101 and between the terminal and the XPTCP gateway apparatus 101, as described below.

The PC 103 operates application programs, such as a web browser, to request predetermined data from the server 107.

As noted above, the PC 103 does not support XPTCP, but the server 107 does. Once the requested data is obtained, the PC 103 uses the application program to transmit a TCP FIN packet (S2501). The TCP FIN packet is received by the address conversion unit 203 through the inside NIC 104. The inside NIC reception processing unit 501 of the address conversion unit 203 converts the transmission origin IP and MAC addresses, the destination MAC address, IP address, and port number of a TCP FIN packet (S2102). In addition, an index port number is recorded by the removal schedule list 605 at this time.

Then, the TCP FIN packet is received by the TCP/IP protocol stack 205, which recognizes the TCP FIN packet based on the port number previously created by the socket processing unit 207. A close event request is then issued to the socket processing unit 207 to notify closure of the connection to the socket processing unit 207, which acts as a server program (S2503).

Upon receiving the close event while acting as a server with respect to the inside NIC 104, the socket processing unit 207 issues the close request event (while acting as a client to the outside NIC 108) in step S2503 (S2504). The close request event is received by the TCP/IP protocol stack 205, which generates a TCP FIN packet (S2505). The TCP FIN packet generated in step S2505 is received by the address conversion unit 203. The outside NIC transmission processing unit 503 of the address conversion unit 203 then converts the transmission origin IP and MAC address, the destination MAC address, IP address, and port number of a TCP FIN packet (S2506).

The TCP FIN packet is sent to the server 107 through the out side NIC 108 (S2507). The server 107 then judges whether all data that should have been transmitted to the PC 103 was transmitted, and if it was, issues a TCP ACK/FIN packet (S2508). The TCP ACK/FIN packet is received by the address conversion unit 203 through the outside NIC 108. The outside NIC reception processing unit 502 of the address conversion unit 203 then converts the transmission origin IP and MAC address, the destination MAC address, IP address, and port number of the TCP ACK/FIN packet (S2509). The TCP ACK/FIN packet is then received by the TCP/IP protocol stack 205, which responds with a TCP ACK packet (S2510). At this time, the TCP/IP protocol stack 205 notifies a close response event to the socket processing unit 207, which acts as a client program.

The XPTCP processing unit 206 intercepts this close response event, and releases the connection to the outside NIC 108, and the connection to the inside NIC 104 (S2511). A TCP ACK packet generated by the TCP/IP protocol stack 205 in step S2510 is received by the address conversion unit 203, and the outside NIC transmission processing unit 503 of the address conversion unit 203 rewrites the transmission origin IP and MAC address, the destination MAC address, IP address, and port number of a TCP ACK packet (S2512). The TCP ACK packet is then sent to the server 107 through the outside NIC 108, and the server 107 recognizes that closure of the connection is completed (S2513).

On the other hand, the close response event generated by the TCP/IP protocol stack 205 in step S2510 is received by the socket process part 207, which recognizes that the TCP FIN packet with respect to the connection to the outer side NIC 108, when a close response event is detected. Cutting of the connection assigned to corresponding inner side NIC 104 at this time is then performed. Then the accept event is sent to the TCP/IP protocol stack 205 acknowledging the close event which the TCP/IP protocol stack 205 sent in step S2503 (S2514).

The accept event which the socket processing unit 207 sent in step S2514 is received by the TCP/IP protocol stack 205, which generates a TCP ACK/FIN packet in response (S2515). the TCP ACK/FIN packet is sent to the address conversion unit 203, and the inside NIC transmission processing unit 504 of the address conversion unit 203 restores the transmission origin IP and MAC address, the destination MAC address, IP address, and port number of the TCP ACK/FIN packet (S2516). The TCP ACK/FIN packet is then sent to the PC 103 through the inside NIC 104, and the PC 103 responds with a TCP ACK packet (S2517).

The TCP ACK packet is then received by the address conversion unit 203 through the inside NIC 104, and the inside NIC reception processing unit 501 of the address conversion unit 203 converts the transmission origin IP and MAC address, the destination MAC address, IP address, and port number of the TCP ACK packet (S2518). Afterwards, the TCP ACK packet is sent to the TCP/IP protocol stack 205, which recognizes that the closure of the connection was completed based on the arrival of the TCP ACK packet (S2519).

Then, after step S2509, the address conversion unit 203 rewrites the value of the address table update counter 213 in the counter value field for timers of corresponding records in both the inside NIC address table 209 and the outside NIC address table 210 (S2520). The table update processing unit 505 monitors these counter value fields regularly to determine whether a predetermined time passes after which the records of both the inside NIC address table 209 and the outside NIC address table 210 are deleted (S2521, S2522).

As can be appreciated, a TCP FIN packet is not the only way to end a TCP connection. During an abnormal state, such as freezing of an application program, a TCP RST packet may be used to force closure of the connection. Closure of the connection through the use of the TCP RST packet is illustrated in dotted lines in FIGS. 25-27, but a description thereof is omitted for brevity as one of ordinary skill would recognize the procedure from these figures and the above descriptions.

As first recognized by the present inventor, a packet P1402 received from PC 102, which does not support XPTCP, that is unrelated to the IP address of inside NIC 104 and the outside NIC 108, cannot be directly processed by the TCP/IP protocol stack 205. Therefore, the present advancements modify the transmission origin MAC address, the transmission origin IP address, the transmission origin port number, the destination MAC address, destination IP address, and destination port number attached to the packet P1402 and record corresponding original values in the inside NIC address table 209. Temporary values are then assigned to these parameters so that the TCP/IP protocol stack 205 can process the packet correctly and send it to one of the inside NIC 104 or outside NIC 108. Consecutive numbers are also assigned as port numbers, which also serve as indexes so that after processing by the TCP/IP protocol stack 205, the original parameter values for the packet can be determined using the assigned port number as an index to either the inside NIC address table 209 or the outside NIC address table 210. Then these parameters are again rewritten, this time with their original values for transmission of the packet to its final destination. Note that the Index port is provided as a transmission origin port number, and a destination port number is not changed. In almost all cases, a destination port number is a specific port number.

XPTCP can be mounted with respect to a specific service, and therefore can perform encryption processes specific to each service for which it is mounted. Since each service must be distinguished with a destination port number, the inside NIC reception processing unit 501 does not change the destination port number when rewriting the other parameter values described above.

As explained above, the XPTCP gateway apparatus 101 rewrites the transmission origin MAC address, the transmission origin IP address, destination MAC address, and destination IP address attached to the received packet so that the internal TCP/IP protocol stack 205 can correctly process the packet. Just before transmitting the packet to the final destination, the transmission origin MAC address, the transmission origin IP address, the destination MAC address, and the destination IP address are restored to their original values, avoiding a need to change the settings of the existing network environment. Thus, the XPTCP gateway apparatus 101 can be inserted in a communication path to provide XPTCP functionality without extensive network setting changes. The XPTCP gateway apparatus is also transparent to the devices connected thereto. Even ICMP packets, such as PING, are transferred as they are through the XPTCP gateway apparatus 101 transparently.

Further, the IP addresses assigned to the inside NIC 104 and the outside NIC 108 of the XPTCP gateway apparatus 101 do not interfere with hosts connected to the XPTCP gateway apparatus 101. That is, whether these IP addresses are unrelated to the sub-net to which the XPTCP gateway apparatus 101 is connected or whether these IP address overlap with those of connected hosts is irrelevant. Operation is not hampered because the addresses are rewritten internally, in the XPTCP gateway apparatus 101 during address conversion. Therefore, the IP addresses assigned to the inside NIC 104 and the outside NIC 108 are not visible to an outside network or any equipment connected thereto. Therefore, the IP addresses set to the inner side NIC 104 and the outer side NIC 108 may be any address except loopback address and multicast addresses.

Next, a sample application of the XPTCP gateway apparatus 101 according to the exemplary embodiments is explained. The XPTCP gateway apparatus 101 may also include a server function to allow a user to edit the XPTCP processing object master 208 through a web server and a specifically assigned port number. If, for example, the specifically assigned port number is 10030, the XPTCP processing unit 206 can provide information directly to a web server program without performing an encryption process through this port number.

Figure 28:
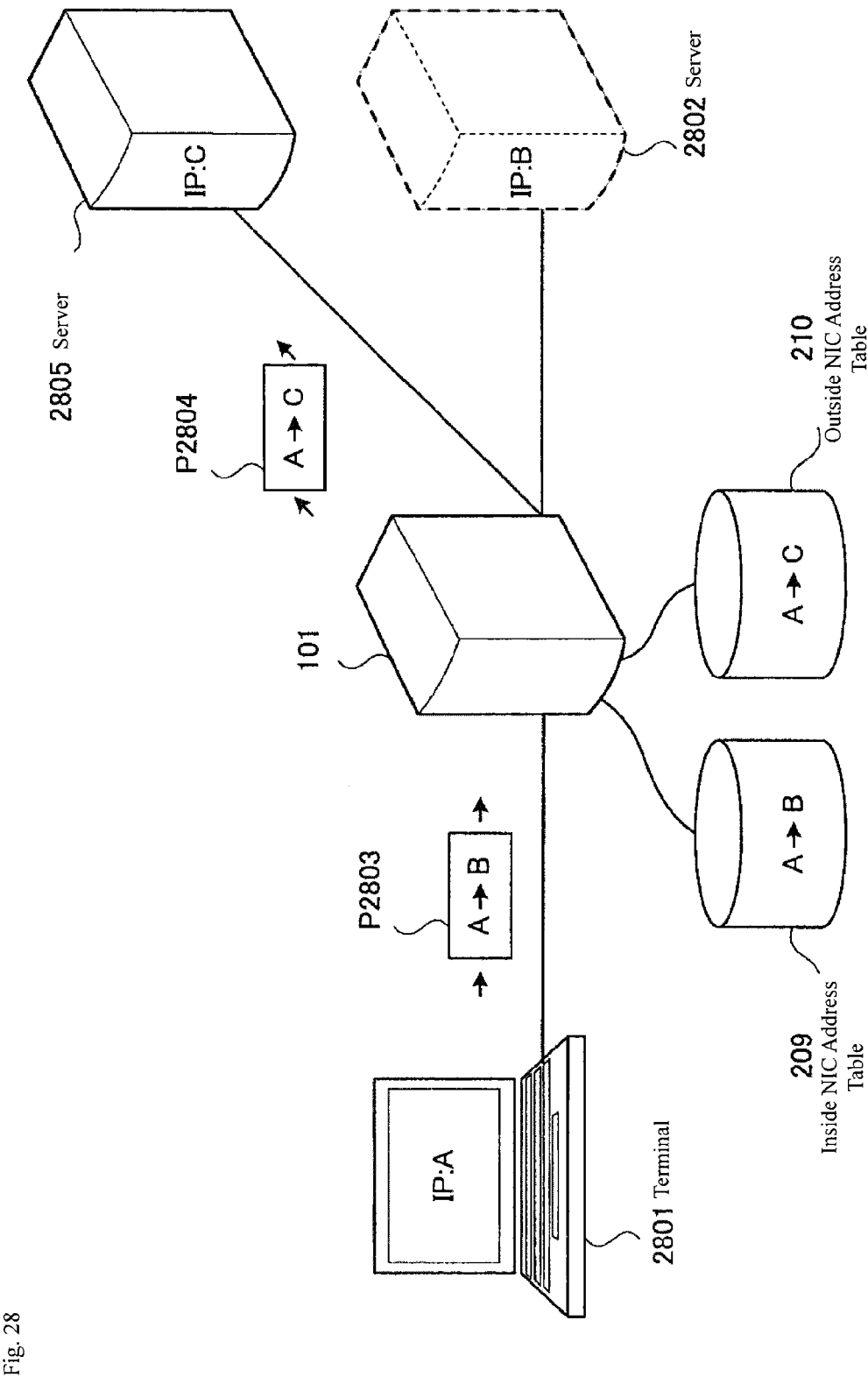
FIG. 28 is a schematic diagram of an XPTCP gateway apparatus that rewrites the destination IP address of a transmitted packet according to the exemplary embodiment of the present advancements.

The address conversion unit 203 rewrites the transmission origin, destination MAC address, IP address, and port number in two tables, the inside NIC address table 209 and the outside NIC address table 210. When the destination IP address field of the outside NIC address table 210 is rewritten, communication with a server having an IP address different from the IP address with which communication is originally intended is possible. FIG. 28 is the schematic explaining rewriting of the destination IP address of the packet which transmits in the XPTCP gateway apparatus 101. An IP address called "A" is provided to the terminal 2801. Terminal 2801 presupposes that the packet P2803 was transmitted in order to connect with the server 2802 to which an IP address called "B" is provided. In other words, the transmission origin IP address of a packet P2803 is "A", and a destination IP address is "B". The inside NIC address table 209 of the XPTCP gateway apparatus 101 therefore links "A" and "B". However, the outside NIC address table 210 does not necessarily need to link "A" and "B". When a destination IP address is rewritten to "C" in the outside NIC address table 210, the destination for the packet becomes "C". Then packet P2804 is sent to the server 2805 corresponding to the IP address "C". Thus, the XPTCP gateway apparatus 101 can also mask the destination of the packet so that the terminal 2801 cannot determine that the destination IP address is or even that it has been rewritten in the outside NIC address table 210. When this operation is applied, VPN (Vitual Private Network) can be easily set up by including the XPTCP gateway apparatus 101 in a two or more unit link.

Figure 29:
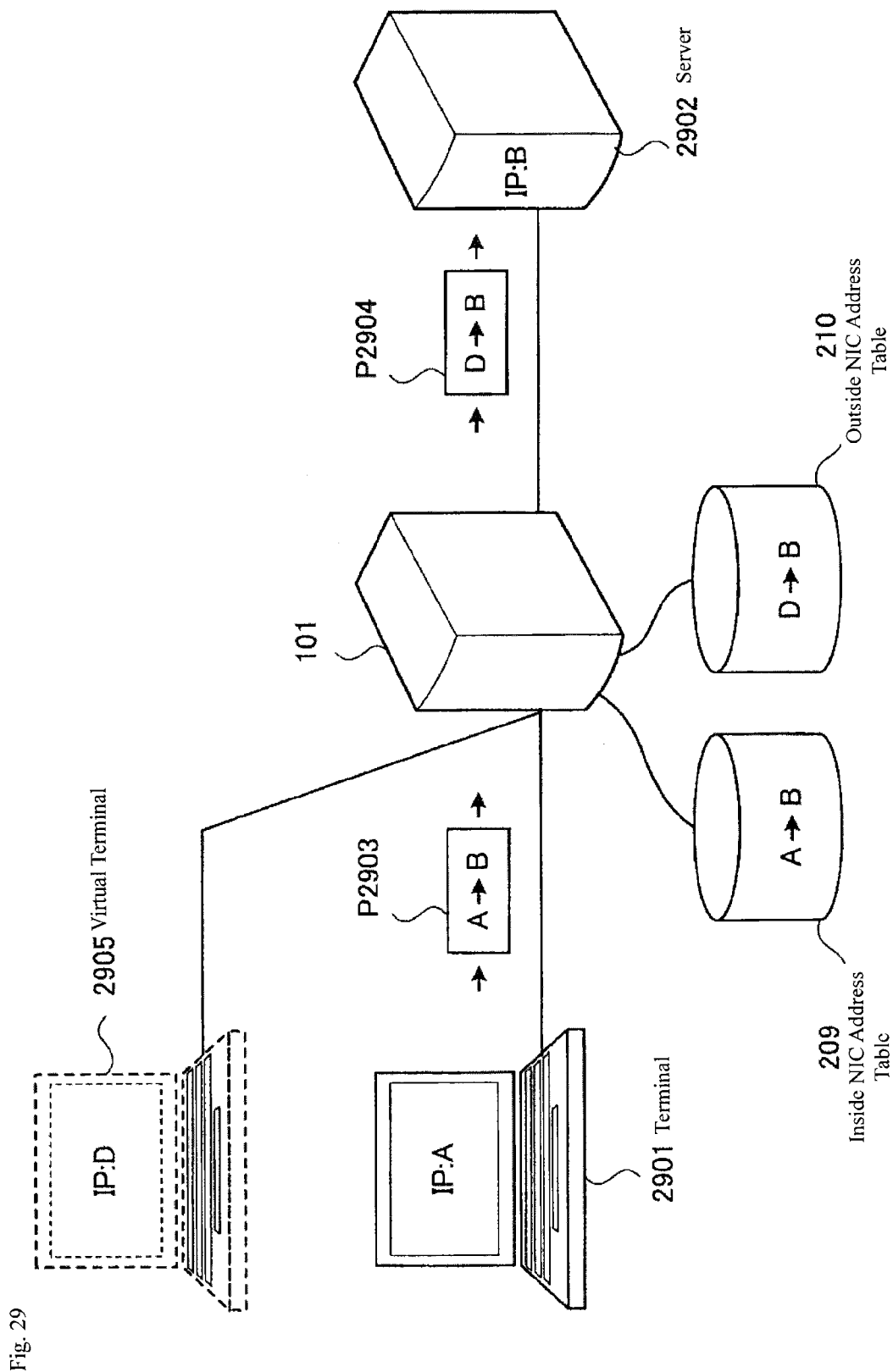
FIG. 29 is a schematic diagram of an XPTCP gateway apparatus that rewrites the transmission origin IP address of the packet which transmits according to exemplary embodiments of the present advancements.

In another example, when the transmission origin IP address field of the outer side NIC address table 210 is rewritten, the true IP address of a terminal 2801 can be concealed from a malicious third party at the server side. FIG. 29 is the schematic explaining the application in which the transmission origin IP address of the packet transmitted through the XPTCP gateway apparatus 101 is rewritten. An IP address called "A" is provided to the terminal 2901. The terminal 2901 presupposes that the packet P2903 was transmitted in order to connect with the server 2902 to which an IP address called "B" is provided. In other words, the transmission origin IP address of a packet P2903 is "A", and a destination IP address is "B". The inside NIC address table 209 of the XPTCP gateway apparatus 101 links "A" and "B". However, the outside NIC address table 210 does not necessarily need to link "A" and "B". When a transmission origin IP address is rewritten to "D", a transmission origin IP address will be "D" for the packet P2904 sent from the XPTCP gateway apparatus 101. Then, since the origin IP address the virtual terminal 2905 is visible only as "D" from a server 2902, the presence of the terminal 2901's IP address "A" can be concealed. Thus, the XPTCP gateway apparatus 101 can conceal a transmission origin IP address from a malicious third party by rewriting the transmission origin IP address registered in the outside NIC address table 210.

When encryption processing unit 1005 performs an encryption process with on the data stream extracted by the TCP/IP protocol stack 205 from the payload part of the TCP data packet, the entire data stream need not be encrypted. For example, in some applications, such as TELNET, it is necessary to encrypt the entire data stream. However, other applications, such as SMTP (Simple Mail Transfer Protocol), email messages may flow through several SMTP servers, making it difficult to have XPTCP encryption throughout the entire transmission path. Therefore, only the transmission and reception terminals and their corresponding hosts implement the authentication and an encryption process, and the actual payload of the email or SMTP message can be encrypted. The SMTP message is divided into a header and a content-text, and additional headers are added as the email travels through different hosts, such as an SMTP servers. In this case, the encryption processing unit 1005 of this embodiment, encrypts only the actual content of the email, not any headers attached thereto, which may include SMTP and/or HTTP protocol data.

In order to implement the XPTCP gateway apparatus 101 with the minimum number of changes to an existing gateway, the TCP/IP protocol stack 205 preinstalled in the existing network OS is utilized to the utmost, and a process to implementing the necessary security by providing the TCP/IP protocol stack 205 with artificial information instead of actual information is performed. For example, the TCP/IP protocol stack is provided artificial MAC addresses and destination IP addresses instead of true MAX and destination IP addresses. For the TCP/IP protocol stack 205 to process packets correctly, a note of the transmission origin MAC address, the transmission origin IP address, the transmission origin port number, the destination MAC address, destination IP address, and destination port number which are previously attached to the packet is made to the inside NIC address table 209 and the outside NIC address table 210. Preferably, these addresses are unrelated to the addresses allocated to the XPTCP gateway apparatus. The transmission origin MAC address and transmission origin IP address which are attached to the packet are then replaced by an artificial MAC address and an artificial IP address and these artificial values are given to the TCP/IP protocol stack 205.

Furthermore, when transmitting a packet to an original transmission destination, the TCP/IP protocol stack 205 is provided the artificial MAC address and artificial IP address so that the packet can be processed internally in the XPTCP gateway apparatus 101. After this processing, the transmission origin MAC address, the transmission origin IP address, destination MAC address, and destination IP address of the packet are rewritten to their original address so that the packet can be sent to its original destination.

Thus, in the XPTCP gateway apparatus 101, the transmission origin MAC address, the transmission origin IP address, destination MAC address, and destination IP address which are attached to the received packet are rewritten so that the internal TCP/IP protocol stack 205 can process the received packet. Just before transmitting, a transmission origin MAC address, a transmission origin IP address, a destination MAC address, and a destination IP address are restored in the packet. Therefore, the existing network environment does not require any setting changes other than placing the XPTCP gateway apparatus 101 in the communication path between a terminal and a corresponding server.

As mentioned above, although the present advancements were described in terms of exemplary embodiments, the present advancements are no limited to these embodiments, and additional features and modifications are possible without departing from the scope of these advancements as one of ordinary skill can appreciate when the following claims are read in light of the above specification.

The invention claimed is:

1. A network gateway apparatus, comprising:
a first network interface card connected to a first network and configured to communicate with devices connected to the first network;
a second network interface card connected to a second network and configured to communicate with devices connected to the second network;
a processor including
an initialization unit configured to initialize the first and second network interface cards to an unprotected state, and
a TCP/IP protocol stack configured to perform communication processing between the first and second network interface cards,
wherein when a packet is received via the first network interface card, the processor
replaces an origin MAC address of the packet with a first temporary MAC address, an origin IP address with a first temporary IP address, a destination MAC address with a MAC address of the second network interface card, and a destination IP address with an IP address of the second network interface card,
then transmits the packet to the TCP/IP protocol stack, and
the TCP/IP protocol stack transmits the packet to the second network interface card based on the destination MAC address and the destination IP address of the packet after replacing by the processor,
wherein the processor further includes
an address conversion unit configured to establish a TCP connection with the first network interface card, and to establish a TCP connection with the second network interface card, the address conversion unit acting as a server with respect to the first network interface card and acting as a client with respect to the second network interface card, and
a socket processing unit configured to open and close TCP connections with the TCP/IP protocol stack, the socket processing unit establishing a TCP connection between the first network interface card and the TCP/IP protocol stack via the address conversion unit and establishing a TCP connection between the TCP/IP protocol stack and the second network interface card via the address conversion unit.

2. The network gateway apparatus according to claim 1, further comprising:
a memory device configured to store at least one address mapping table,
wherein the processor creates a record in the at least one address mapping table and assigns a unique port number to the packet, the record storing the origin MAC address and the origin IP address in association with the destination MAC address and the destination IP address, the unique port number serving as an index to the at least one address mapping table to identify the record.

3. The network gateway apparatus according to claim 2, wherein the processor further includes an extended TCP processing unit configured to perform predetermined encryption on a payload of the packet upon receipt of the packet from the TCP/IP protocol stack, and to return the packet to the TCP/IP protocol stack after performing the predetermined encryption.

4. The network gateway apparatus according to claim 2, wherein the address conversion unit adds a record to the at least one mapping table when the packet is a TCP SYN packet.

5. The network gateway apparatus according to claim 4, wherein after encryption of the payload of the packet, the TCP/IP protocol stack provides the packet to the socket processing unit, and the socket processing unit providing the packet to the second network interface card.

6. The network gateway apparatus according to claim 1, wherein the TCP connection with the second network interface card is established in response to receipt of a TCP SYN packet at the first network interface card,
the address conversion unit receives an ARP request packet from the TCP/IP protocol stack, and
the address conversion unit responds to the TCP/IP protocol stack with an ARP response packet including an artificial MAC address.

7. The network gateway apparatus according to claim 2, wherein the address conversion unit adds a new record to the at least one address mapping table upon receipt of a TCP SYN packet at the first network interface card.

8. The network gateway apparatus according to claim 1, further comprising:
a memory device configured to store a first address mapping table and a second address mapping table,
wherein the first address mapping table stores, in association, a first origin MAC address, a first origin IP address, a first destination MAC address, a first destination IP address, and a first unique port number assigned to the packet to identify the first origin MAC and IP addresses and to identify the first destination MAC and IP addresses, the first address mapping table corresponding to the first network interface card,
the second address mapping table stores, in association, a second origin MAC address, a second origin IP address, a second destination MAC address, a second destination IP address and a second unique port number assigned to the packet to identify the second origin MAC and IP addresses and the second destination MAC and IP addresses, the second address mapping table corresponding to the second network interface card, the TCP/IP protocol stack assigning the second unique port number as a dynamic port number, and the processor converts the origin port number of the packet to the first unique port number stored in the first address mapping table, searches the second address mapping table using a destination port number included in the packet to identify a corresponding record stored therein, and rewrites the corresponding record.

9. The network gateway apparatus according to claim 1, wherein the memory further stores an extended TCP processing object master including an origin IP, an origin port number, a destination IP and a destination port number, when an origin IP address, an origin port number, a destination IP address and a destination port number of an outgoing packet are registered in the extended TCP processing object master, the address conversion unit replaces the origin IP address, an origin MAC address, the destination IP address and an destination MAC address in the outgoing packet and provides the outgoing packet to the second network interface card, and when the origin IP address, origin port number, destination IP address and destination port number of the outgoing packet are not registered in the extended TCP processing object master, the address conversion unit provides the outgoing packet to the second network interface card without replacement of the origin IP address, the origin MAC address, the destination IP address and the destination MAC address.

10. The network gateway apparatus according to claim 9, wherein when an origin IP address, a destination IP address and port numbers of an incoming packet are registered in the extended TCP processing object master, the address conversion unit replaces an origin MAC address, the origin IP address, a destination MAC address and the destination IP address in the incoming packet and provides the incoming packet to the TCP/IP protocol stack, and when the origin IP address, the destination IP address and the port numbers of the incoming packet are not registered in the extended TCP processing object master, the address conversion unit does not replace the origin MAC address, the origin IP address, the destination MAC address and the destination IP address in the incoming packet before providing the packet to the TCP/IP protocol stack.

11. A method of providing secure communication in a network environment, comprising:
connecting a first network interface card to a first network;
connecting a second interface card to a second network;
initializing the first and second network interface cards to an unprotected state;
receiving a packet via the first network interface card;
replacing, in the packet, an origin MAC address with a first temporary MAC address, an origin IP address with a first temporary IP address, a destination MAC address with a MAC address of the second network interface card and a destination IP address with an IP address of the second interface card;
transmitting the packet to a TCP/IP protocol stack; and
transmitting the packet from the TCP/IP protocol stack to the second network interface card based on the destination MAC address and the destination IP address of the packet after the replacing step,
wherein the method further includes
establishing, with an address conversion unit, a TCP connection with the first network interface card, and establishing, with the address conversion unit, a TCP connection with the second network interface card,
acting as a server with respect to the first network interface card and acting as a client with respect to the second network interface card, and
establishing a TCP connection between the first network interface card and the TCP/IP protocol stack via the address conversion unit and establishing a TCP connection between the TCP/IP protocol stack and the second network interface card via the address conversion unit.

12. A non-transitory computer-readable medium encoded with computer-readable instructions thereon that when executed by a computer cause the computer to perform a process comprising:
connecting a first network interface card to a first network;
connecting a second interface card to a second network;
initializing the first and second network interface cards to an unprotected state;
receiving a packet via the first network interface card;
replacing, in the packet, an origin MAC address with a first temporary MAC address, an origin IP address with a first temporary IP address, a destination MAC address with a MAC address of the second network interface card and a destination IP address with an IP address of the second interface card;
transmitting the packet to a TCP/IP protocol stack; and
transmitting the packet from the TCP/IP protocol stack to the second network interface card based on the destination MAC address and the destination IP address of the packet after the replacing step,
wherein the process further includes
establishing, with an address conversion unit, a TCP connection with the first network interface card, and establishing, with the address conversion unit, a TCP connection with the second network interface card,
acting as a server with respect to the first network interface card and acting as a client with respect to the second network interface card, and
establishing a TCP connection between the first network interface card and the TCP/IP protocol stack via the address conversion unit and establishing a TCP connection between the TCP/IP protocol stack and the second network interface card via the address conversion unit.

* * * * *